United States Patent
Matoba

(10) Patent No.: US 9,497,195 B2
(45) Date of Patent: Nov. 15, 2016

(54) SYSTEM, METHOD OF DISCLOSING INFORMATION, AND APPARATUS

(71) Applicant: FUJITSU LIMITED, Kawasaki-shi, Kanagawa (JP)

(72) Inventor: Kazumine Matoba, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 345 days.

(21) Appl. No.: 14/227,489

(22) Filed: Mar. 27, 2014

(65) Prior Publication Data
US 2014/0365653 A1 Dec. 11, 2014

(30) Foreign Application Priority Data
Jun. 5, 2013 (JP) .................................. 2013-119286

(51) Int. Cl.
| | |
|---|---|
| H04L 29/06 | (2006.01) |
| H04L 29/08 | (2006.01) |
| H04L 12/58 | (2006.01) |
| G06Q 10/10 | (2012.01) |

(52) U.S. Cl.
CPC ............... *H04L 63/10* (2013.01); *G06Q 10/10* (2013.01); *H04L 51/32* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 7,783,710 | B2 * | 8/2010 | Ramaswamy | G06Q 10/107 455/466 |
| 7,853,664 | B1 * | 12/2010 | Wang | G06Q 30/06 379/88.01 |
| 8,881,306 | B2 * | 11/2014 | Feldman | G06F 21/44 726/29 |
| 2003/0078894 | A1 | 4/2003 | Kon | |
| 2004/0077335 | A1 * | 4/2004 | Lee | H04L 63/08 455/410 |
| 2004/0133908 | A1 * | 7/2004 | Smith | H04L 63/045 725/31 |
| 2005/0120248 | A1 * | 6/2005 | Medvinsky | H04L 9/3263 726/4 |
| 2005/0165559 | A1 * | 7/2005 | Nelson | G06F 19/3456 702/27 |
| 2005/0271207 | A1 * | 12/2005 | Frey | H04L 9/001 380/263 |

(Continued)

FOREIGN PATENT DOCUMENTS

| | | |
|---|---|---|
| JP | 2003-67326 | 3/2003 |
| JP | 2009-199368 | 9/2009 |

*Primary Examiner* — Ninos Donabed
(74) *Attorney, Agent, or Firm* — Staas & Halsey LLP

(57) ABSTRACT

A system includes a first device configured to provide a first service usable by a first user, a second device configured to provide a second service usable by a second user, and a third device configured to include a memory and a processor coupled to the memory. The processor is configured to receive a first instruction from the first user, the first instruction for disclosing information about the first service to the second user, transmit authentication information to the second user based on the reception of the first instruction, and disclose information collected from the first service to the second user when receiving an access using the authentication information from the second user.

15 Claims, 25 Drawing Sheets

(56) References Cited

U.S. PATENT DOCUMENTS

| | | | | |
|---|---|---|---|---|
| 2006/0073811 A1* | 4/2006 | Ekberg | H04W 12/06 | 455/411 |
| 2009/0113063 A1* | 4/2009 | Yeh | H04L 63/0807 | 709/229 |
| 2009/0199276 A1* | 8/2009 | Schneider | H04L 63/0815 | 726/5 |
| 2009/0287922 A1* | 11/2009 | Herwono | H04L 9/0822 | 713/155 |
| 2009/0323718 A1* | 12/2009 | Oren-Dahan | H04L 63/029 | 370/466 |
| 2010/0222022 A1* | 9/2010 | Fujita | H04L 63/0807 | 455/406 |
| 2010/0228776 A1* | 9/2010 | Melkote | G06F 3/0481 | 707/770 |
| 2010/0251334 A1* | 9/2010 | Xiao | H04L 41/0893 | 726/3 |
| 2011/0047373 A1* | 2/2011 | Karasawa | G06F 21/33 | 713/156 |
| 2011/0191417 A1* | 8/2011 | Rathod | G06Q 30/02 | 709/204 |
| 2011/0282942 A1* | 11/2011 | Berger | G06Q 50/01 | 709/204 |
| 2011/0283172 A1* | 11/2011 | Berger | G06Q 50/01 | 715/202 |
| 2012/0066613 A1* | 3/2012 | Berger | G06Q 30/01 | 715/751 |
| 2012/0159337 A1* | 6/2012 | Travilla | G06Q 30/0631 | 715/738 |
| 2012/0210011 A1* | 8/2012 | Liu | H04L 63/10 | 709/229 |
| 2012/0210200 A1* | 8/2012 | Berger | G06F 3/04845 | 715/202 |
| 2012/0239741 A1* | 9/2012 | Fujiwara | G06Q 50/01 | 709/204 |
| 2012/0265758 A1* | 10/2012 | Han | G06F 17/30038 | 707/737 |
| 2012/0309539 A1* | 12/2012 | Smith | A63F 13/10 | 463/42 |
| 2013/0042312 A1* | 2/2013 | Wickman | H04L 63/08 | 726/7 |
| 2014/0006505 A1* | 1/2014 | Rama Rao | H04L 51/32 | 709/204 |

\* cited by examiner

FIG. 4A

| SERVICE ID | AUTHORIZATION CODE | ACCESS TOKEN | SESSION ID |
|---|---|---|---|
| A | Code1 | Token1 | SID1 |
| A | Code2 | Token2 | SID2 |

FIG. 4B

| SERVICE ID | SESSION ID | DATA ID | DATA |
|---|---|---|---|
| A | SID1 | A1-1 | DataA1-1 |
| A | SID1 | A1-2 | DataA1-2 |
| A | SID1 | A1-3 | DataA1-3 |
| A | SID1 | A2-1 | DataA2-1 |

FIG. 4C

| SESSION ID | SERVICE ID | USER ID |
|---|---|---|
| SID1 | X | User2 |
| SID2 | X | User3 |

FIG. 4D

| SERVICE ID | USER ID | TICKET |
|---|---|---|
| X | User2 | T1 |
| X | User3 | NOT ISSUED |

FIG. 13A

| USER GROUP ID | SERVICE ID | USER ID |
|---|---|---|
| UGID1 | X | User2 |
| UGID1 | Y | User2 |

FIG. 13B

| SERVICE ID | USER ID | TICKET |
|---|---|---|
| Group | UGID1 | T1 |
| X | User3 | NOT ISSUED |

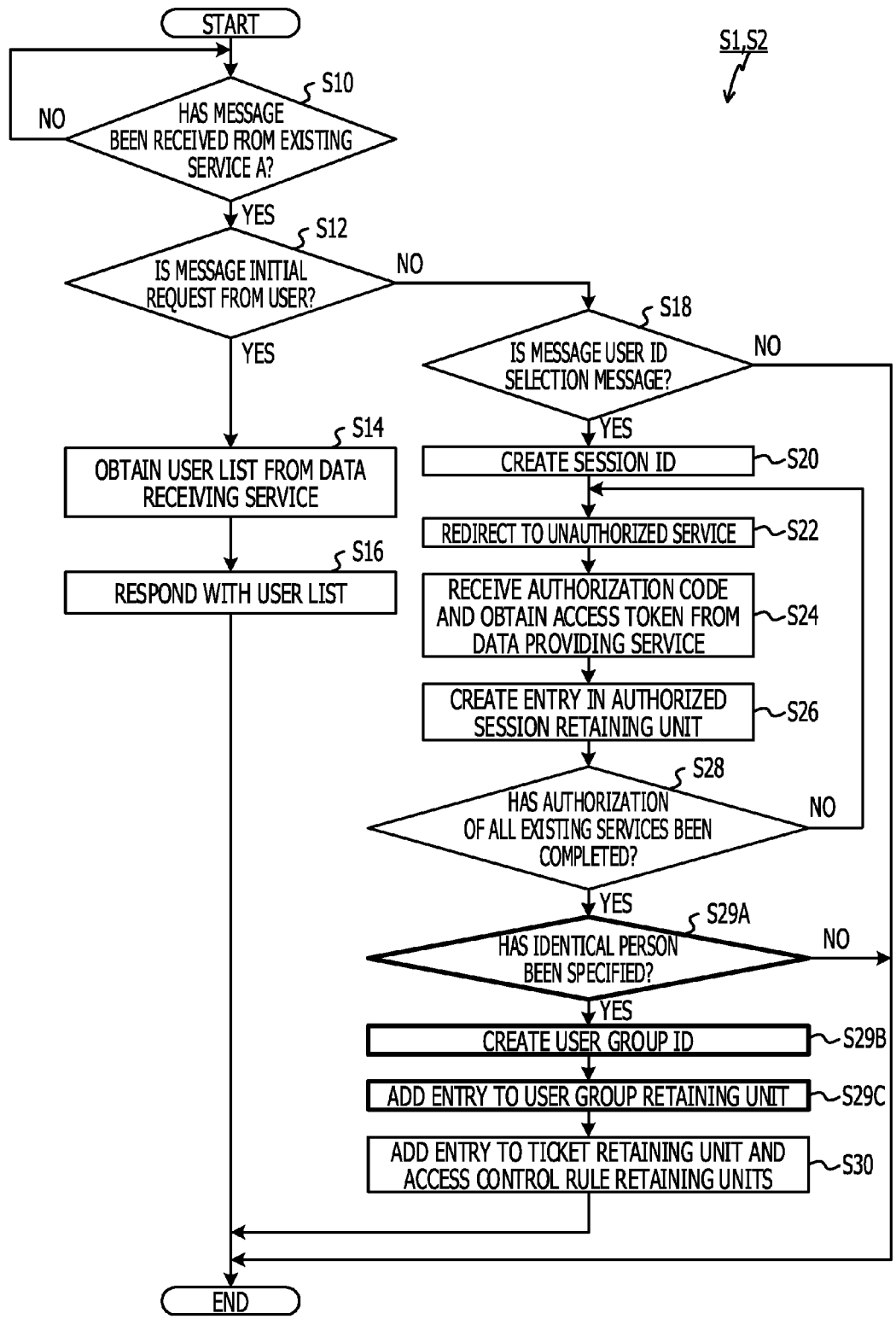

FIG. 19A

| TYPE | SERVICE ID | USER ID | TICKET |
|---|---|---|---|
| USER | X | User2 | T1 |
| USER | X | User3 | NOT ISSUED |
| SERVICE | X | * | T2 |

FIG. 19B

| SESSION ID | SERVICE ID | USER ID |
|---|---|---|
| SID1 | X | User2 |
| SID2 | X | * |

FIG. 24A

| SERVICE ID | SESSION ID | RULE |
|---|---|---|
| A→X | FORMAT CONVERSION | JSON→XML |
| A→X | FIELD NAME CONVERSION | Field1→Data_ID |

FIG. 24B

```
{
 "Data": {
   "Field1": "100",
   "Value": "256"
  }
}
```

FIG. 24C

```
<Data>
 <Data_ID>100</Data_ID>
 <Value>256</Value>
</Data>
```

SYSTEM, METHOD OF DISCLOSING INFORMATION, AND APPARATUS

CROSS-REFERENCE TO RELATED APPLICATION

This application is based upon and claims the benefit of priority of the prior Japanese Patent Application No. 2013-119286, filed on Jun. 5, 2013, the entire contents of which are incorporated herein by reference.

FIELD

The embodiments discussed herein are related to a system, a method of disclosing information, and an apparatus.

BACKGROUND

When personal data is distributed among a plurality of existing services, there is a possibility of using the personal data among the plurality of existing services to construct a new service providing a new value. For example, a new service allows a user to find a suitable outing spot within a user's usual activity area (position information) with reference to activity history of a friend with the same preference as user's.

To provide such a new service, data owned by an existing service may be passed to the new service. However, the new service and the existing service may be operated by different operating organizations, and a situation may be assumed in which account integration or the like is difficult. Thus, to provide a new service as described above, a method may be adopted in which a link is established among the services and then the data in the existing service is passed to the new service and is provided to users under the new service.

In related art, a technology of establishing a link for user's situation information and sharing information among different social networking systems (SNSs) and a technology of allowing each of a plurality of entities to mutually use resources stored in the respective entities have been suggested.

As related art, for example, Japanese Laid-open Patent Publication No. 2009-199368 and Japanese Laid-open Patent Publication No. 2003-67326 are disclosed.

To pass data between an existing service and a new service, either one of a user on a data providing side and a user on a data receiving side may create a user account on both services. Also, to pass data between these services, either one of the services may create an interface function in accordance with a counterpart's service interface. Thus, it is difficult to flexibly establish a link among many services.

Moreover, as an existing technique, there is an agent service in which data is shared between accounts. However, since this agent service provides data passing between two accounts used by the same person in two services, it is difficult to apply this technique to information sharing with other person.

SUMMARY

According to an aspect of the invention, a system includes a first device configured to provide a first service usable by a first user, a second device configured to provide a second service usable by a second user, and a third device configured to include a memory and a processor coupled to the memory. The processor is configured to receive a first instruction from the first user, the first instruction for disclosing information about the first service to the second user, transmit authentication information to the second user based on the reception of the first instruction, and disclose information collected from the first service to the second user when receiving an access using the authentication information from the second user.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A depicts a data structure of an authorized session retaining unit;

FIG. 4B depicts a data structure of a data retaining unit;

FIG. 4C depicts a data structure of an access control rule retaining unit;

FIG. 4D depicts a data structure of a ticket retaining unit;

FIG. 13A depicts a data structure of a user group retaining unit of the second embodiment;

FIG. 13B depicts a data structure of a ticket retaining unit of the second embodiment;

FIG. 14 is a flowchart of processes at steps S1 and S2 in the second embodiment;

FIG. 19A depicts a data structure of a ticket retaining unit of a fourth embodiment;

FIG. 19B depicts a data structure of an access control rule retaining unit in a fourth embodiment;

FIG. 24A depicts a data structure of a conversion rule retaining unit according to the sixth embodiment;

FIG. 24B depicts data before conversion;

FIG. 24C depicts data after conversion; and

DESCRIPTION OF EMBODIMENTS

First Embodiment

An information disclosing system according to a first embodiment is described in detail below based on FIG. 1 to FIG. 9.

Figure 1:
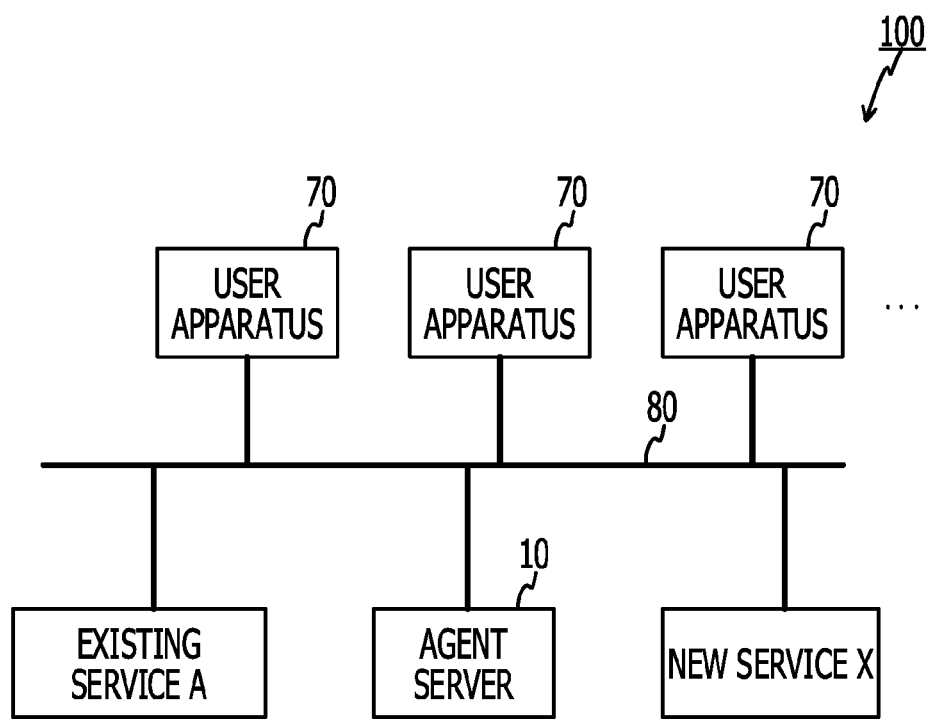
FIG. 1 schematically depicts the structure of an information disclosing system according to a first embodiment.

FIG. 1 schematically depicts the structure of an information disclosing system 100 of the first embodiment. As depicted in FIG. 1, the information disclosing system 100 includes an existing service A, a new service X, an agent server 10, and user apparatuses 70. The existing service A and the new service X each have a server group including one or plurality of servers. The existing service A, the new service X, the agent server 10, and the user apparatuses 70 are connected to a network 80 such as the Internet.

The existing service A is a service which provides predetermined information to users, and a user (for example, a user 1) using one of the user apparatuses 70 is assumed to have an account (a user ID and a password) for the existing service A. That is, the user 1 is assumed to be a user under the existing service A.

The new service X is a service which provides predetermined information to users, and a user (for example, a user 2) using one of the user apparatuses 70 is assumed to have an account (a user ID and a password) for the new service X. That is, the user 2 is assumed to be a user under the new service X. In the present embodiment, it is assumed that the user 1 is not a user under the new service X. It is also assumed that the user 2 is not a user under the existing service A.

Figure 2:
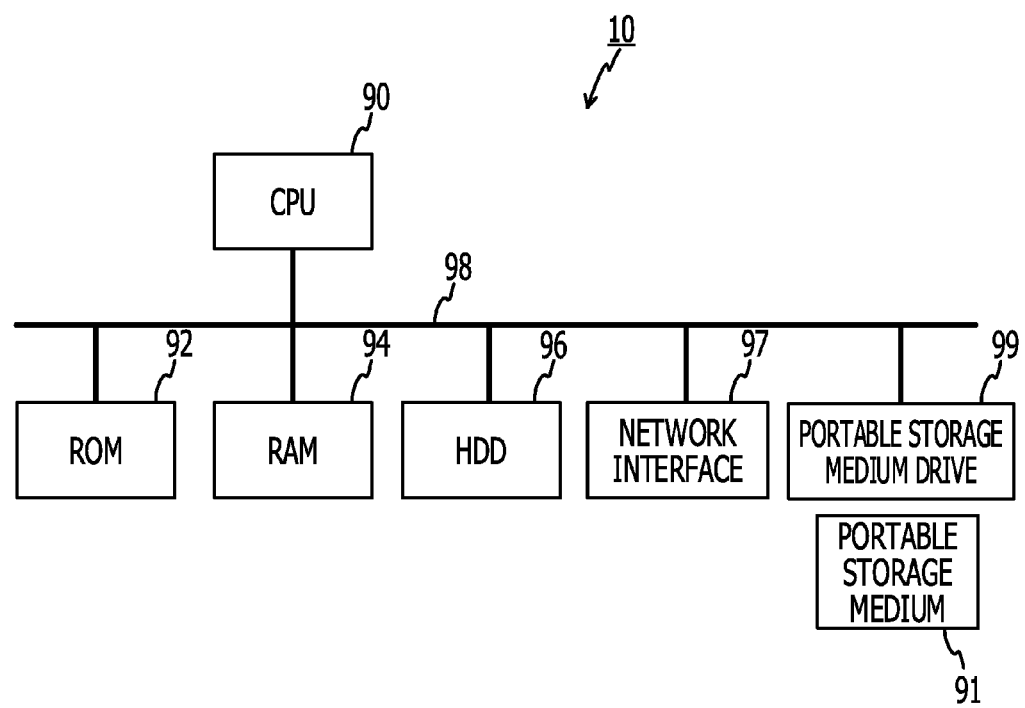
FIG. 2 is a diagram of a hardware structure of an agent server.
Figure 3:
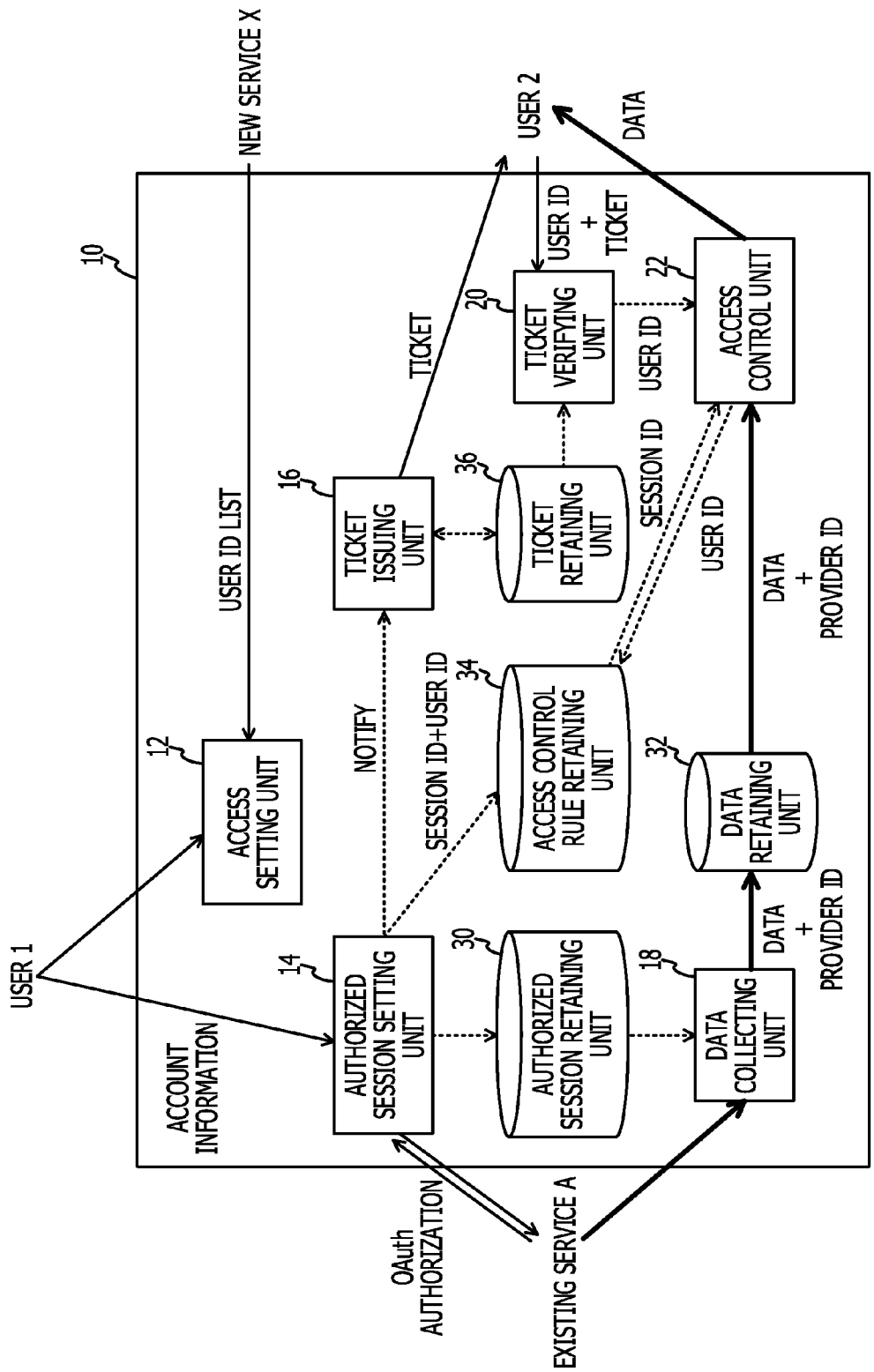
FIG. 3 is a functional block diagram of the agent server according to a first embodiment.

The agent server 10 is a server which obtains data retained in the existing service A by using account information of the user 1 and provides the obtained data to a user (for example, the user 2) to which the user 1 permits data to be passed. FIG. 2 schematically depicts the hardware structure of the agent server 10. As depicted in FIG. 2, the agent server 10 includes a central processing unit (CPU) 90, a read only memory (ROM) 92, a random access memory (RAM) 94, a storage device (here, a hard disk drive (HDD)) 96, a network interface 97, a portable storage medium drive 99, and the like. Each of these components of the agent server 10 is connected to a bus 98. In the agent server 10, with a program (including an information disclosing program) stored in the ROM 92 or the HDD 96 or a program (including an information disclosing program) read by the portable storage medium drive 99 from a portable storage medium 91 being executed by the CPU 90, functions as an access setting unit 12, an authorized session setting unit 14, a ticket issuing unit 16, a data collecting unit 18, a ticket verifying unit 20, and an access control unit 22 depicted in FIG. 3 are provided. FIG. 3 also depicts an authorized session retaining unit 30, a data retaining unit 32, an access control rule retaining unit 34, and a ticket retaining unit 36 provided by the HDD 96 of the agent server 10 and the like.

The access setting unit 12 obtains a user ID list (including the ID of the user 2) from the new service X upon request from the user of the existing service A (the user 1) and provides the obtained user ID list to the user (the user 1).

The authorized session setting unit 14 obtains the account information (the user ID and the password) of the existing service A from the user of the existing service A (the user 1) and creates an authorized session. In the present embodiment, it is assumed that OAuth is used as a technology for allowing the agent server 10 to access the existing service A as the user 1. However, this is not meant to be restrictive, and another method allowing an access authority to be passed to another service may be adopted (for example, security assertion markup language (SAML)).

The authorized session setting unit 14 creates an authorized session and then stores information about the authorized session in the authorized session retaining unit 30. The authorized session setting unit 14 also stores the ID of the user on a data receiving side (for example, the user 2) selected by the user on a data providing side (the user 1) and a session ID of the authorized session in the access control rule retaining unit 34. The authorized session setting unit 14 then notifies the ticket issuing unit 16 of the ID list of the user on the data receiving side.

Here, the authorized session retaining unit 30 is a table for retaining an ID of an existing service and a session ID of an authorized session, and has a data structure as depicted in FIG. 4A. Specifically, as depicted in FIG. 4A, the authorized session retaining unit 30 has fields of "service ID" indicating an ID of an existing service, "authorized code", "access token", and "session ID" indicating an ID of an authorized session. The access control rule retaining unit 34 is a table for retaining a relation between the session ID of the authorized session and the ID of the user on the data receiving side, and has a data structure as depicted in FIG. 4C. Specifically, as depicted in FIG. 4C, the access control rule retaining unit 34 has fields of "session ID" of an authorized session, "service ID" indicating a new service to be used by the user on the data receiving side, and "user ID" indicating the user to which data is to be provided.

Upon receiving the notification from the authorized session setting unit 14, the ticket issuing unit 16 stores a list of user IDs in the ticket retaining unit 36. Here, the ticket retaining unit 36 is a table for retaining a relation between the ID of the user on the data receiving side and a ticket as identification information, and has a data structure as depicted in FIG. 4D. Specifically, as depicted in FIG. 4D, the ticket retaining unit 36 has fields of "service ID" indicating a new service to be used by the user on the data receiving side, "user ID" of the user on the data receiving side, and "ticket". It is assumed that "not issued" is stored in the field of "ticket" until a ticket obtaining request comes from the user on the data receiving side. When a ticket obtaining request comes from the user on the data receiving side, the ticket issuing unit 16 newly generates a ticket, and stores the ticket in the ticket retaining unit 36 and also passes the ticket to the user on the data receiving side.

As a ticket, it is assumed that a universally unique identifier (UUID) is randomly generated for use. In the present embodiment, by way of example, a ticket T1 is an unpredictable character string such as "543b8d39-24a6-496f-8233-97808e9e625" and a ticket T2 is an unpredictable character string such as "23c4e2f4-8cfb-4f00-9537-70947d998a2e". The ticket may be binary data. Also, when passing the ticket to the user on the data receiving side, the ticket issuing unit 16 may respond with a character string directly attached to a body of a HTTP response or as a parameter of structured data (an extensible markup language (XML) or Java® script object notation (JSON)), for example.

The data collecting unit 18 uses the session ID read from the authorized session retaining unit 30, obtains data for a relevant session from the existing service A, and stores the obtained data in the data retaining unit 32. The user on the data providing side (the user 1) may set or may not set a range of data to be obtained in OAuth. When this range is not set, all pieces of data of the user on the data providing side are obtained by the data collecting unit 18. Here, the data retaining unit 32 is a table for retaining a data group for each of session IDs of authorized sessions, and has a data structure as depicted in FIG. 4B. Specifically, the data retaining unit 32 has fields of "service ID" of the service on the data providing side, "session ID" of the authorized session, "data ID" of the collected data, and "data" where the data itself is stored.

The ticket verifying unit 20 checks the ticket retaining unit 36 when obtaining the user ID and the ticket from the user on the data receiving side (the user 2). When successfully verifying the ticket, the ticket verifying unit 20 then transmits the user ID of the user on the data receiving side (the user 2) to the access control unit 22.

Upon receiving the user ID of the user on the data receiving side (the user 2) from the ticket verifying unit 20, the access control unit 22 obtains a list of session IDs (session IDs accessible by the user on the data receiving side) corresponding to the user ID from the access control rule retaining unit 34. The access control unit 22 reads relevant data (or data group) from the data retaining unit 32 based on the type of data (the data list and data of a specified ID) requested from the user on the data receiving side (the user 2), and provides the read data to the user on the data receiving side (the user 2).

General Outline of Process

Figure 5:
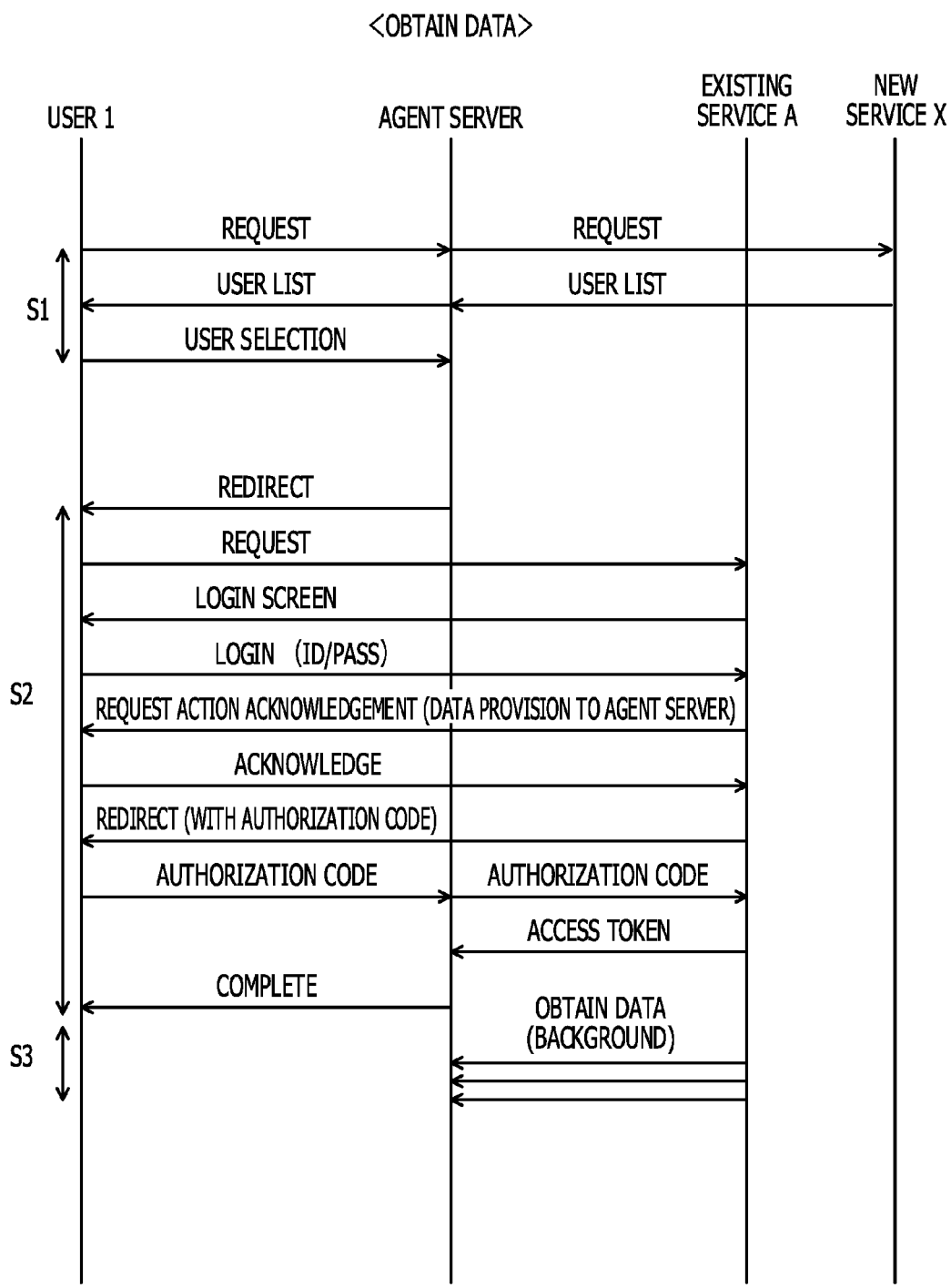
FIG. 5 depicts a data obtaining process.
Figure 6:
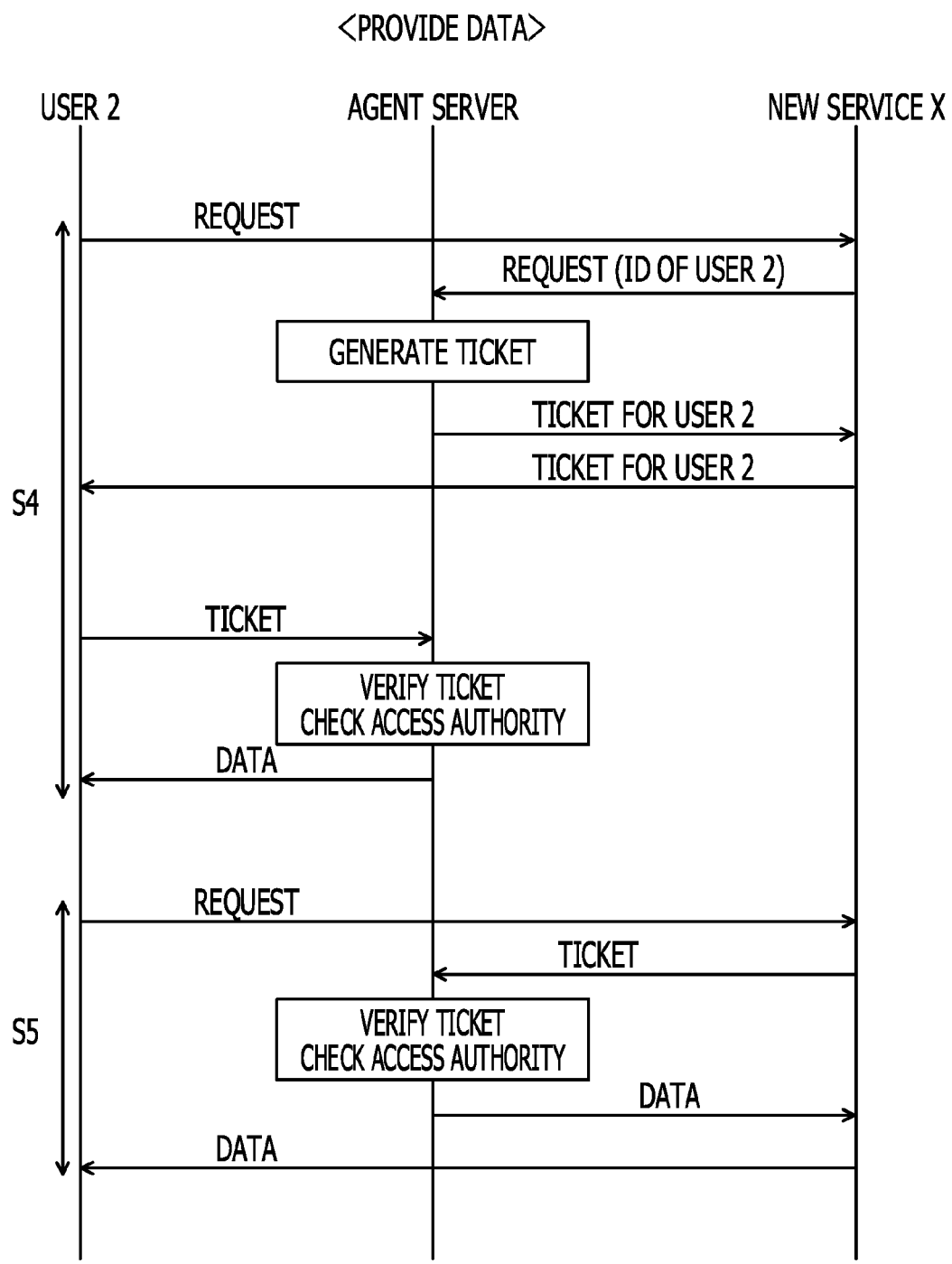
FIG. 6 depicts a data providing process.

Next, a general outline of process in the information disclosing system 100 is described according to FIG. 5 and FIG. 6. In the present embodiment, it is assumed that the data of the user 1 under the existing service A is provided to the user 2 under the new service X. It is also assumed that the user 1 and the user 2 access each service and the agent server 10 from the user apparatuses 70. Furthermore, the information disclosing system 100 performs a data obtaining process depicted in FIG. 5 and a data providing process depicted in FIG. 6. In the following description, for example, the user apparatus 70 of the user 1 may be simply referred to as the user 1, with a reference to the user apparatus 70 omitted therefrom.

Data Obtaining Process

In the data obtaining process, processes as depicted in FIG. 5 are performed.

In FIG. 5, the user 1 first accesses the agent server 10, and selects a service of the data receiving side and a user on the data receiving side (refer to step S1 of FIG. 5). The agent server 10 then uses OAuth to carry out a procedure such as a transfer of access authority so as to be able to obtain data of the user 1 from the existing service (refer to step S2 of FIG. 5). Step S2 of FIG. 5 is repeatedly performed as many as the number of services on the data providing side selected by the user 1.

Next, the agent server 10 obtains (collects) the data of the user 1 from the existing service A (refer to step S3 of FIG. 5). When the user 1 specifies which data is to be shared with the user 2, only the specified data is obtained. Also, when data is regularly updated or added, the agent server 10 is assumed to also regularly obtain data.

Data Providing Process

In the data providing process, processes as depicted in FIG. 6 are performed.

When a request for data of the existing service A (a disclosure request) comes from the user on the data receiving side to the new service X, the agent server 10 issues a ticket to the user 2. Then, when the user 2 uses the ticket to access the agent server 10, the agent server 10 verifies the ticket to check access authority. In this case, when confirming that the ticket is valid, the agent server 10 provides providable data to the user 2 (refer to step S4 of FIG. 6).

As depicted at step S5 of FIG. 6, the user 2 may indirectly access the agent server 10 to receive data provision.

Figure 7:
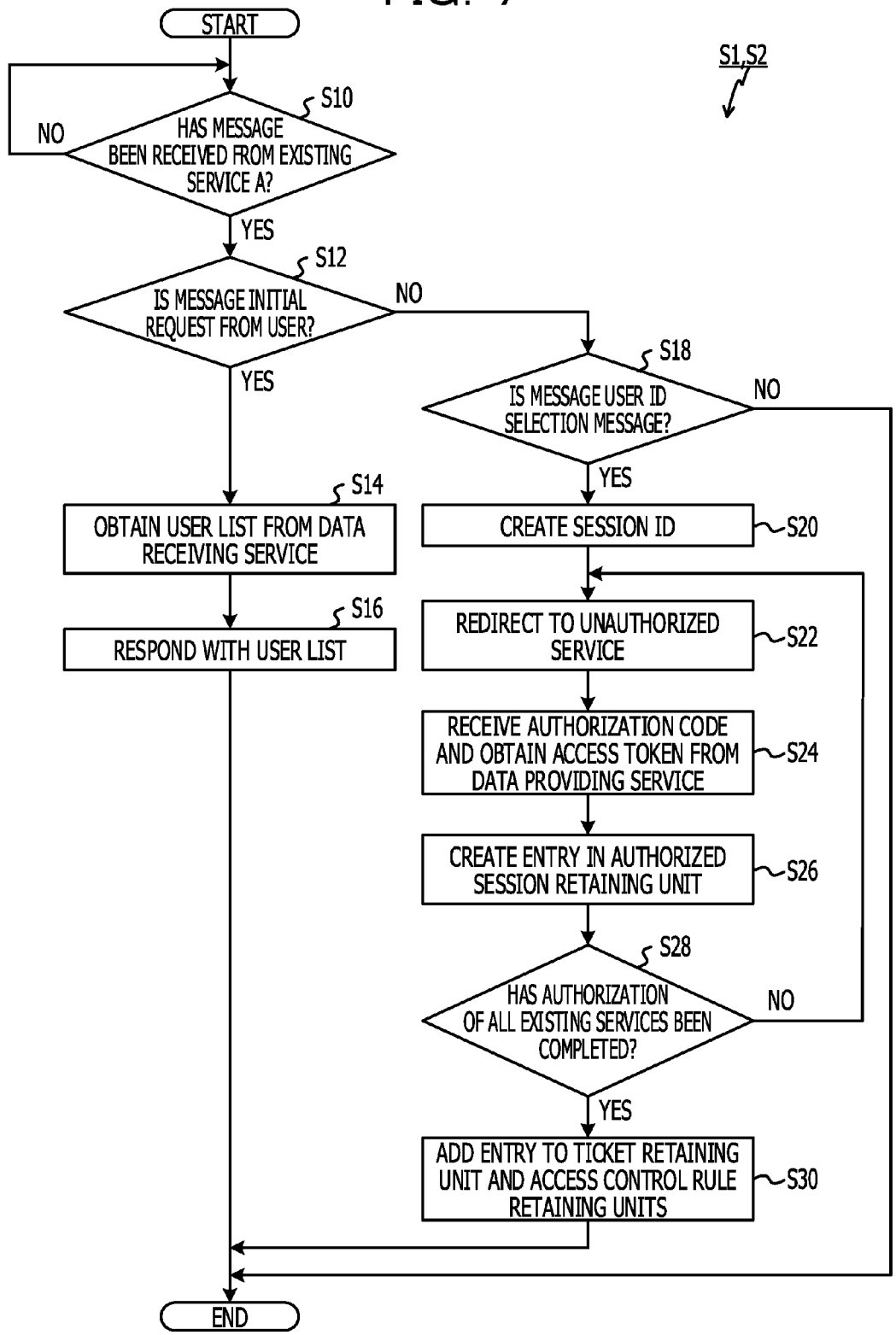
FIG. 7 is a flowchart of processes of an agent server at steps S1 and S2 in FIG. 5.
Figure 8:
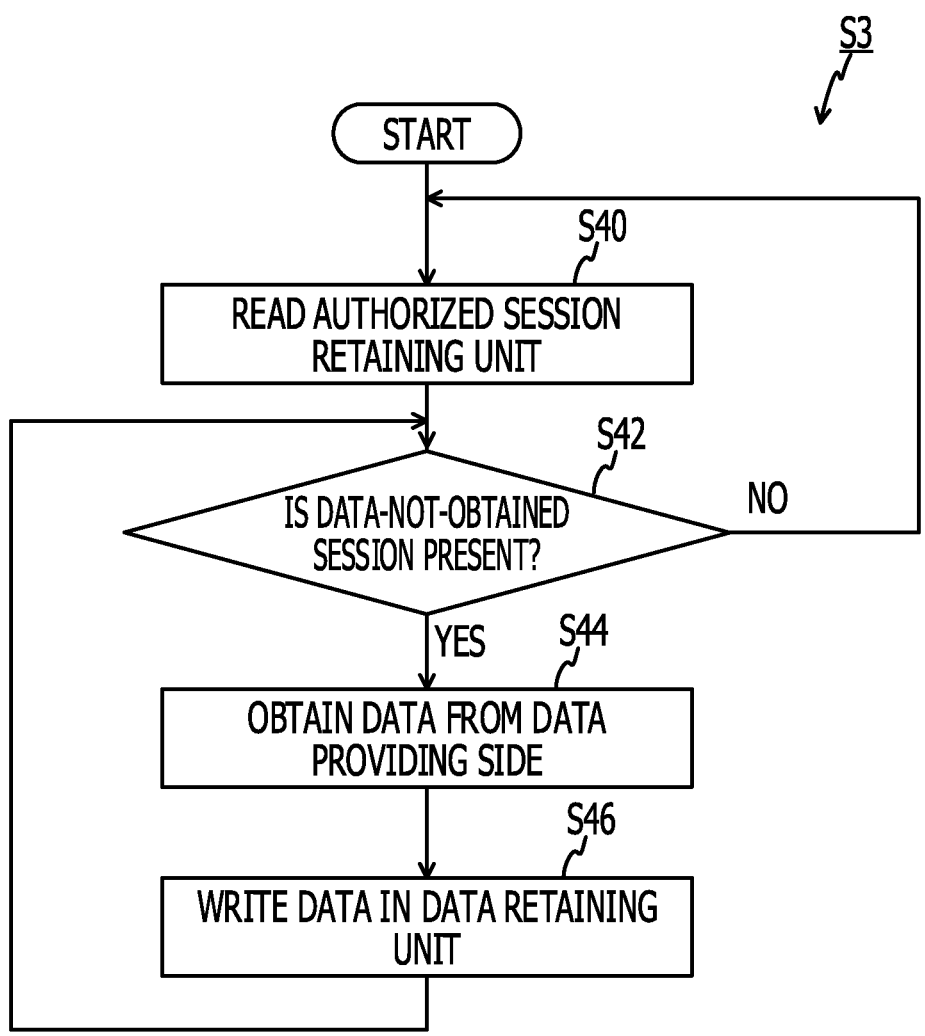
FIG. 8 is a flowchart of a process of an agent server at step S3 in FIG. 5.
Figure 9:
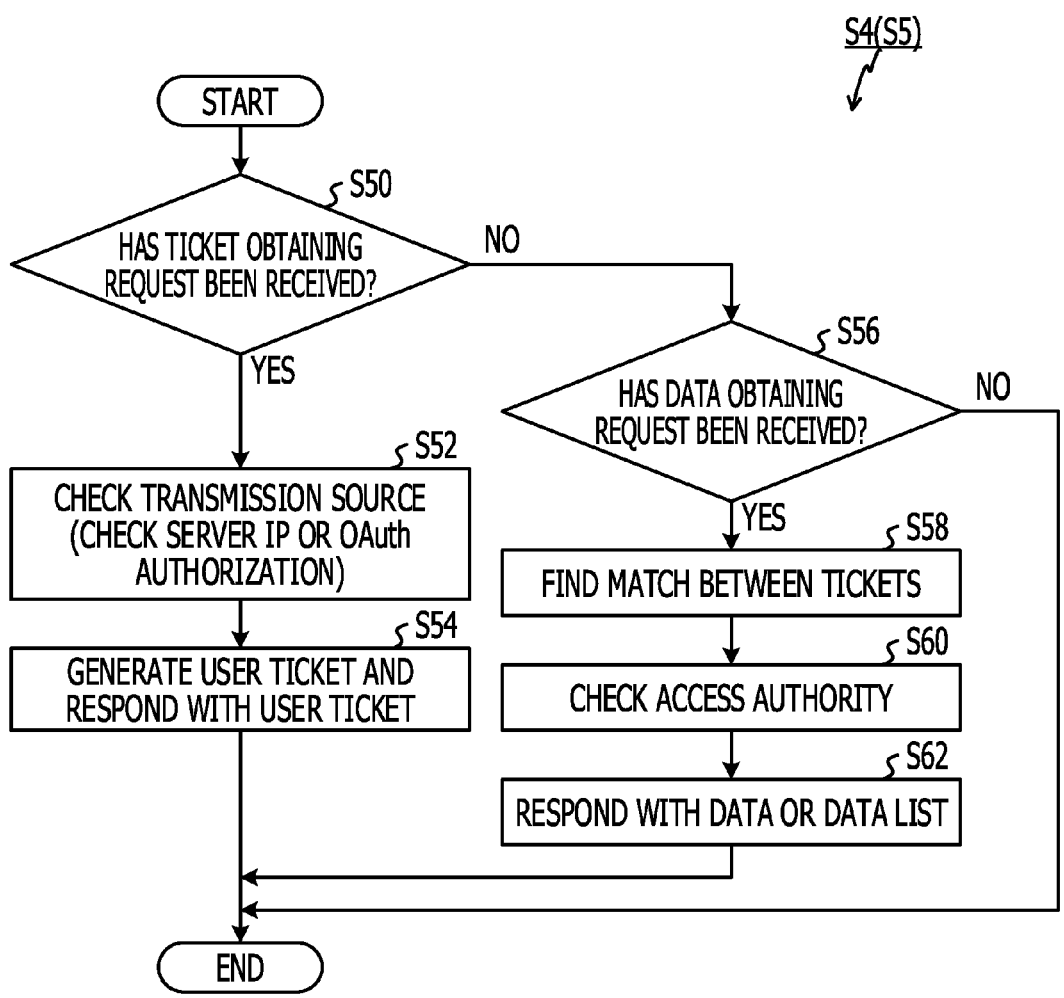
FIG. 9 is a flowchart of a process of an agent server at step S4 in FIG. 6.

Next, each of the above-mentioned processes is described in detail according to the flowcharts of FIG. 7, FIG. 8, and FIG. 9.

(Regarding Steps S1 and S2)

FIG. 7 depicts processes of the agent server 10 at step S1 and S2 of FIG. 5 by using a flowchart. Also in the following, it is assumed that the existing service A is a service on the data providing side, the user 1 is a user on the data providing side, the new service X is a service on the data receiving side, and the user 2 is a user on the data receiving side.

In the processes of FIG. 7, at step S10, the access setting unit 12 waits until the access setting unit 12 receives a message of the user 1 from the existing service A. In this case, the access setting unit 12 proceeds to step S12 at the stage of receiving a message from the existing service A (the user 1).

Upon proceeding to step S12, the access setting unit 12 determines whether the message is an initial request from the user (the user 1). When the determination at step S12 is positive (when the message is an initial request from the user 1), the procedure proceeds to step S14. When the determination at step S12 is negative, the procedure proceeds to step S18.

Upon proceeding to step S14, the access setting unit 12 obtains a user list from the service on the data receiving side (the new service X) in response to the initial request from the user 1. This user list is a list, for example, having stored IDs of all users under the service on the data receiving side.

Next at step S16, the access setting unit 12 responds to the user 1 with the obtained user list. For example, when the user 1 makes a request with a specific keyword specified, the access setting unit 12 may respond with a list of users including the specific keyword in the user list. Then, the entire process of FIG. 7 ends.

On the other hand, when the message is not an initial request from the user 1 and the determination at step S12 is negative, the procedure proceeds to step S18. At step S18, the authorized session setting unit 14 determines whether the message from the user 1 is a user ID selection message. The user ID selection message is a message indicating the result of selecting a user (a user ID) from the user list obtained by the user 1 at step S16. It is assumed herein that the user 1 selects the user 2 from the user list. In this case, the determination at step S18 is positive, and the procedure proceeds to step S20. When the determination at step S18 is negative (when the message from the existing service A is neither an initial request nor a user ID selection message), the entire process of FIG. 7 ends.

Upon proceeding to step S20, the authorized session setting unit 14 creates a session ID of an authorized session. Thereafter, at steps S22 to S30, the authorized session setting unit 14 performs an access authority transfer process by using OAuth for the user 1 of the existing service A.

For example, in the case of OAuth 2.0, the authorized session setting unit 14 first performs redirection to an unauthorized service (here, the existing service A) at step S22. Specifically, the authorized session setting unit 14 returns a response of a redirect instruction to the user 1. In this case, the user 1 accesses a login screen of the existing service A, and logs in by using the user ID and the password. Then, the existing service A returns a screen for confirming that the existing service A provides data to the authorized session setting unit 14, and the user 1 approves the provision. Then, upon a response from the existing service A, redirection is made to a URL of the agent server 10.

Next at step S24, the authorized session setting unit 14 receives an authorization code from a character string included in a parameter of the URL, and passes this authorization code to the existing service A, thereby obtaining an access token from the existing service A. Thereafter, the data collecting unit 18 uses the obtained access token to obtain the data of the user 1.

Next at step S26, the authorized session setting unit 14 sets a character string of the access token (for example, "SID1") as a session ID of the authorized session, and stores the session ID together with the ID of the existing service A (creates an entry) in the authorized session retaining unit 30.

Next at step S28, the authorized session setting unit 14 determines whether authorization of all existing services (when the user selects a plurality of existing services) has been completed. When the determination at step S28 is negative, the procedure returns to step S22 to repeat the process and determination at steps S22 to S28. When the determination at step S28 is positive, the procedure proceeds to step S30.

Upon proceeding to step S30, the authorized session setting unit 14 adds the entry to the ticket retaining unit 36 and the access control rule retaining unit 34. Specifically, the authorized session setting unit 14 notifies the ticket issuing unit 16 of the user on the data receiving side (the user 2 of the new service X (User2)). The ticket issuing unit 16 then checks whether the user 2 of the new service X has been registered in the ticket retaining unit 36. If the user 2 has not been registered, the user 2 is registered in the ticket retaining unit 36. The authorized session setting unit 14 stores the session ID and the user on the data receiving side (the user 2 of the new service X (User2)) in the access control rule retaining unit 34. After the process at step S30 is performed, the entire process of FIG. 7 ends.

The access token has an expiration date. If the access token expires, an expiration date has to be obtained again for change. Therefore, the authorization code may be handled as a session ID.

Regarding Step S3

FIG. 8 depicts a process of the agent server 10 at step S3 of FIG. 5 by using a flowchart.

In the process depicted in FIG. 8, first at step S40, the data collecting unit 18 reads entries in the authorized session retaining unit 30. Next at step S42, the data collecting unit 18 determines whether a data-not-obtained session is present with reference to the data retaining unit 32. When the determination is negative, the procedure returns to step S40. When the determination is positive, the procedure proceeds to step S44.

Upon proceeding to step S44, the data collecting unit 18 obtains data regarding the data-not-obtained session from the data providing side. Specifically, the data collecting unit 18 transmits a request by adding an access token (or a session ID) to the existing service A. In this case, the existing service A refers to the access token to find that an access has been made with the authority of the user 1. Therefore, the data of the user 1 is returned to the data collecting unit 18 of the agent server 10. With this, the data collecting unit 18 obtains the data from the existing service A.

Next at step S46, the data collecting unit 18 writes the session ID and the obtained data in the data retaining unit 32. The data collecting unit 18 then returns to step S42, repeatedly performing the above-described process. With the process described above, data is sequentially collected in the data retaining unit 32.

Regarding Step S4 (S5)

FIG. 9 depicts a process of the agent server 10 at step S4 of FIG. 6 by using a flowchart.

In the process of FIG. 9, first at step S50, the ticket issuing unit 16 determines whether a ticket obtaining request has been received. It is assumed herein that the user 2 accesses the new service X and logs in as the user 2 of the new service X (User2) and the new service X sends a request to the ticket issuing unit 16 of the agent server 10 to obtain a ticket of the user 2 (User2). In this case, the determination at step S50 is positive, and the ticket issuing unit 16 proceeds to step S52.

Upon proceeding to step S52, the ticket issuing unit 16 checks login by OAuth or performs inter-server authentication between the new service X and the agent server 10 (server IP check), thereby checking the request transmission source. Also, based on the ID of the transmission-source user sent together at this time, the ticket issuing unit 16 confirms that the request is a ticket issuing request regarding the user 2 on the data receiving side.

Next at step S54, the ticket issuing unit 16 checks the entries in the ticket retaining unit 36 and, if the ticket of the user 2 has not been issued, the ticket issuing unit 16 newly creates a ticket (T1 in FIG. 4D), and responds (transmits the ticket) to the new service X. In the new service X, the received ticket (T1) is transferred to the user apparatus 70 used by the user 2. Thereafter, the entire process of FIG. 9 ends.

On the other hand, when the determination at step S50 is negative, the ticket verifying unit 20 proceeds to step S56, determining whether a data obtaining request has been received. When the determination is negative, the entire process of FIG. 8 ends. When the determination is positive, the procedure proceeds to step S58. The determination at step S56 is positive when the user 2 uses the ticket (T1), the ID (X) of the new service X, and the ID (User2) of the user 2 to make a data obtaining request to the ticket verifying unit 20.

When the determination at step S56 is positive and the procedure proceeds to step S58, the ticket verifying unit 20 finds a match between the received ticket and the contents in the ticket retaining unit 36 (FIG. 4D). Also, the ticket verifying unit 20 checks at step S60 whether a combination of the received ticket and the contents in the ticker retaining unit 36 is correct, thereby checking access authority. When access authority is confirmed, the ticket verifying unit 20 transmits the ID (User2) of the user 2 of the new service X to the access control unit 22.

At step S62, the access control unit 22 responds with data or the data list. Specifically, the access control unit 22 reads an entry in the access control rule retaining unit 34 (FIG. 4C) and obtains a session ID (SID1) accessible by the user 2 of the new service X. The access control unit 22 then reads the requested data from the data retaining unit 32 (FIG. 4B) in the data of the session ID (SID1), and responds to the user 2. The user may specify, in the request, a data ID to specify specific data, or may specify a data list.

When it is ensured that the user 2 accesses the agent server 10 via the new service X, the new service X may retain a relation between the ticket T1 and the user 2 (User2) instead of transferring the ticket to the user 2 at step S54. In this case, with the user 2 accessing the agent server 10 via the new service X, the processes at step S58 onward are performed via the new service X, as depicted at step S5 of FIG. 6.

By performing the above-described processes, the data of the user 1 is provided (disclosed) to the user 2 even if the user 1 and the user 2 do not create an account on the agent server 10.

As described in detail above, according to the first embodiment, the information disclosing system 100 includes the agent server 10 which transmits a ticket to the user 2 (S54) upon receiving a request from the user 1 under the existing service A for disclosing data of the service A to the user 2 under the new service X (positive at step S18) and discloses the information collected from the service A when an access from the user 2 comes by using the ticket (positive at step S56). With this, the data of the user 1 is disclosed to the user 2 even if the user 2 does not create an account for accessing the agent server 10 or the service A.

Also in the first embodiment, with the user 2 using the ticket transmitted from the agent server 10 to the user 2, an access to an access-set range by the user 1 to the user 2 (data linked to the session ID in the data retaining unit 32) is possible. With this, appropriate access control is performed for each user.

Here, comparative examples are described.

First Comparative Example

Figure 10:
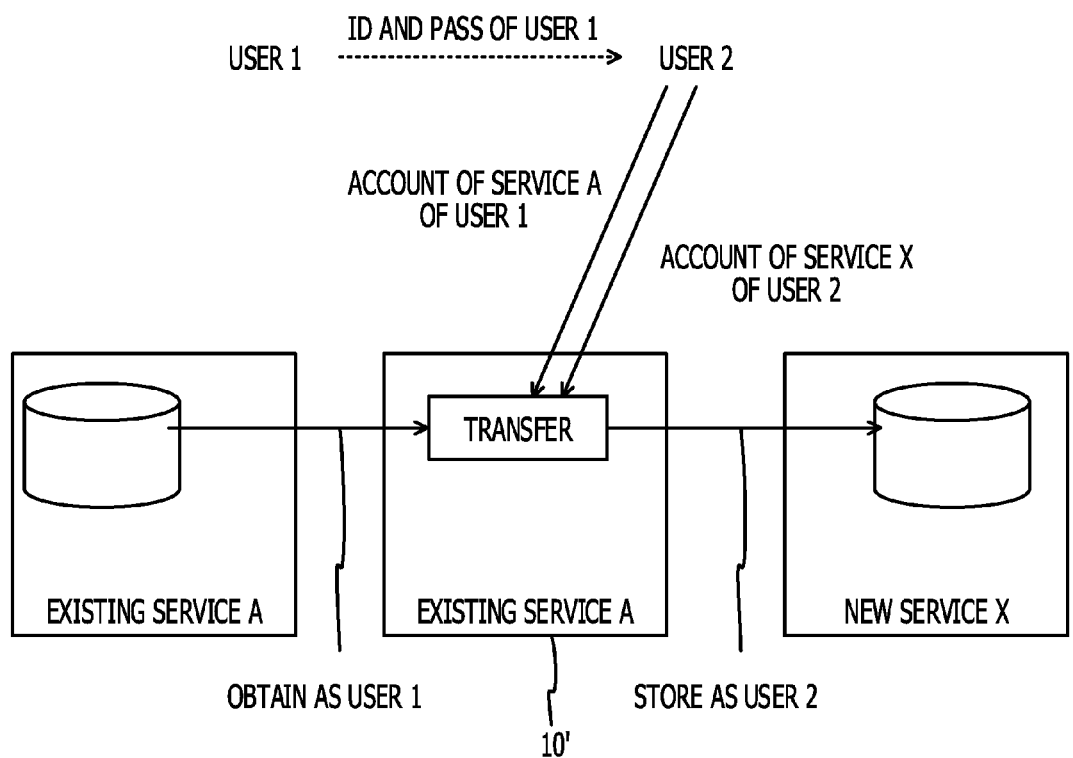
FIG. 10 depicts a first comparative example.

FIG. 10 depicts a general outline of a first comparative example. As depicted in FIG. 10, in the first comparative example, the user 2 is notified of the account (the user ID and the password) of the user 1 of the existing service A in order to disclose the data of the existing service A to the user 2 under the new service X. Then, the user 2 registers both of the account of the new service X and the account of the user 1 of the existing service A in an agent server 10'. With this, the agent server 10' obtains information from the existing service A by using the account of the user 1 and passes the information to the new service X by using the account of the user 2.

However, in the first comparative example, the user 2 is notified of the account of the user 1. Therefore, a security risk may be involved. Moreover, since the account of the existing service A is usable by the user 2, information the user 1 does not desire to share with the user 2 may be shared. Furthermore, the user 2 may use the account to perform an operation the user 1 does not intend (such as data writing). By contrast, in the information disclosing system 100 of the first embodiment, the user 2 is not notified of the account of the user 1, and therefore the above-described situation does not occur.

Second Comparative Example

Figure 11:
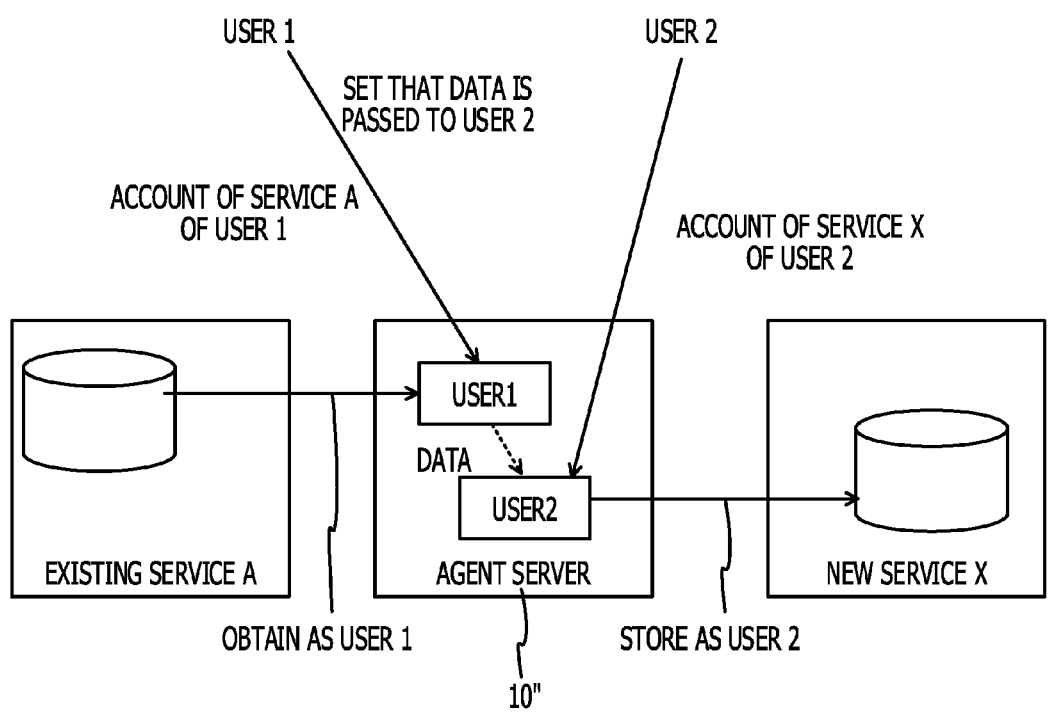
FIG. 11 depicts a second comparative example.

FIG. 11 depicts a general outline of a second comparative example. In the second comparative example of FIG. 11, both the user 1 and the user 2 create user accounts in an agent server 10". Then, it is set that the user 1 is allowed to pass data to the user 2 in the agent server 10".

However, in the second comparative example, user accounts have to be created in the agent server 10" only for the purpose of passing data. This is burdensome. By contrast, in the information disclosing system 100 of the first embodiment, accounts are not created.

Second Embodiment

Figure 12:
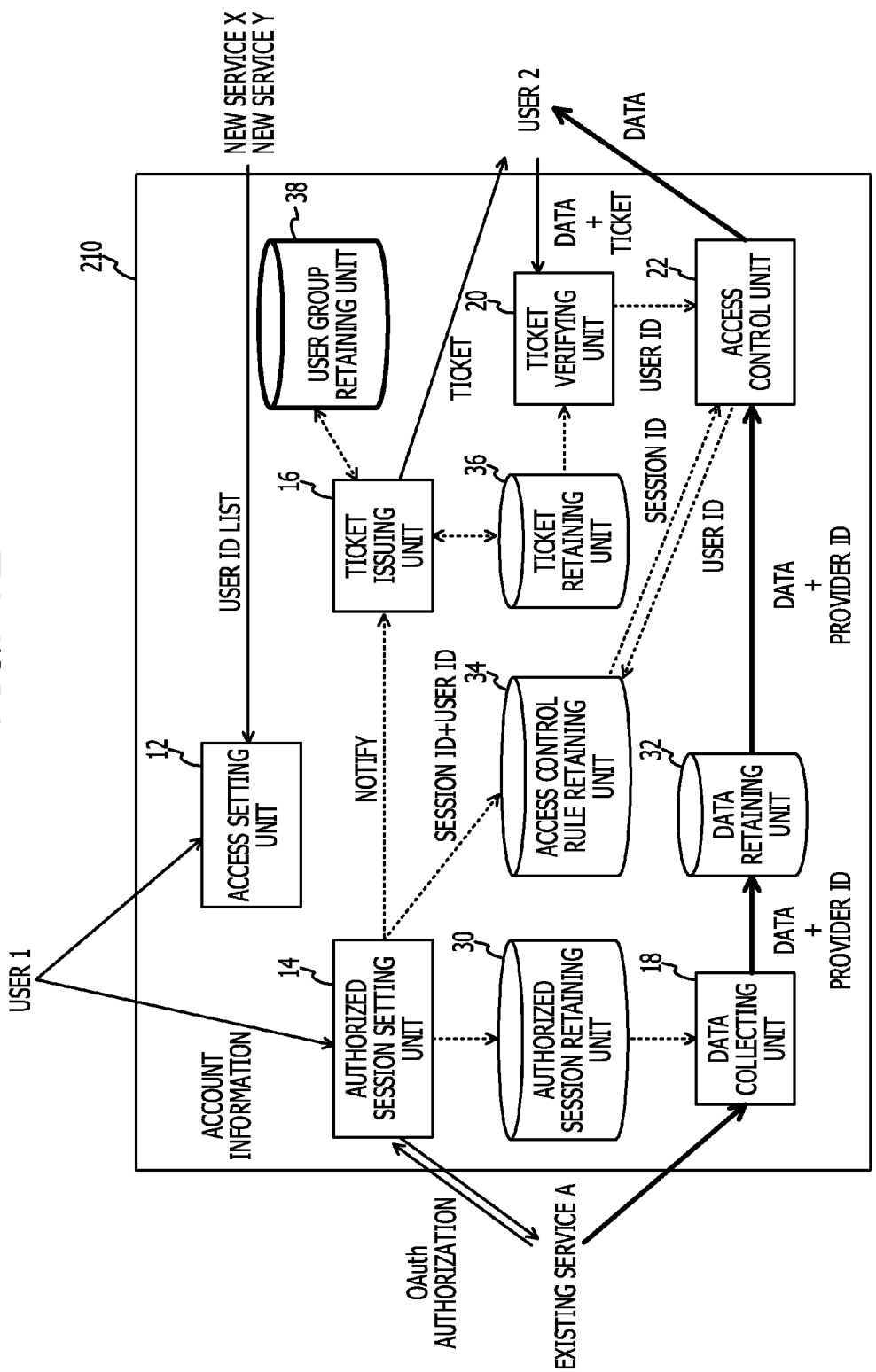
FIG. 12 is a functional block diagram of an agent server according to a second embodiment.

Next, a second embodiment is described based on FIG. 12, FIG. 13A, FIG. 13B, FIG. 14, and FIG. 15. FIG. 12 depicts a functional block diagram of an agent server 210 according to the second embodiment. As evident by comparison between FIG. 12 and FIG. 3, the agent server 210 is different from the agent server 10 of the first embodiment in that a user group retaining unit 38 is provided.

FIG. 13A depicts an example of a data structure of the user group retaining unit 38. The user group retaining unit 38 has fields of "user group ID", "service ID", and "user ID", as depicted in FIG. 13A.

FIG. 14 depicts processes at step S1 and S2 in the second embodiment by using a flowchart. The processes of FIG. 14 are those corresponding to FIG. 7 of the first embodiment. Also, processes surrounded by bold lines in FIG. 14 (steps S29A to S29C) are those different from the first embodiment. For example, when the user 1 specifies to the authorized session setting unit 14 that "the user 2 of the new service X and the user 2 of a new service Y are identical", the authorized session setting unit 14 passes this information to the ticket issuing unit 16. In this case, after steps S20 to S28 of FIG. 14, the determination at step S29A (the determination whether it is specified that the users are identical) is positive, and therefore the ticket issuing unit 16 proceeds to step S29B.

Upon proceeding to step S29B, the ticket issuing unit 16 newly creates a user group ID (UGID1). The ticket issuing unit 16 then registers an entry of service ID="Group" and user ID="UGID1" in the ticket retaining unit 36, as depicted in FIG. 13B. Furthermore, at step S29C, the ticket issuing unit 16 registers (adds) two entries of (UGID1, X, User2) and (UGID1, Y, User2) in the user group retaining unit 38, as depicted in FIG. 13A.

Figure 15:
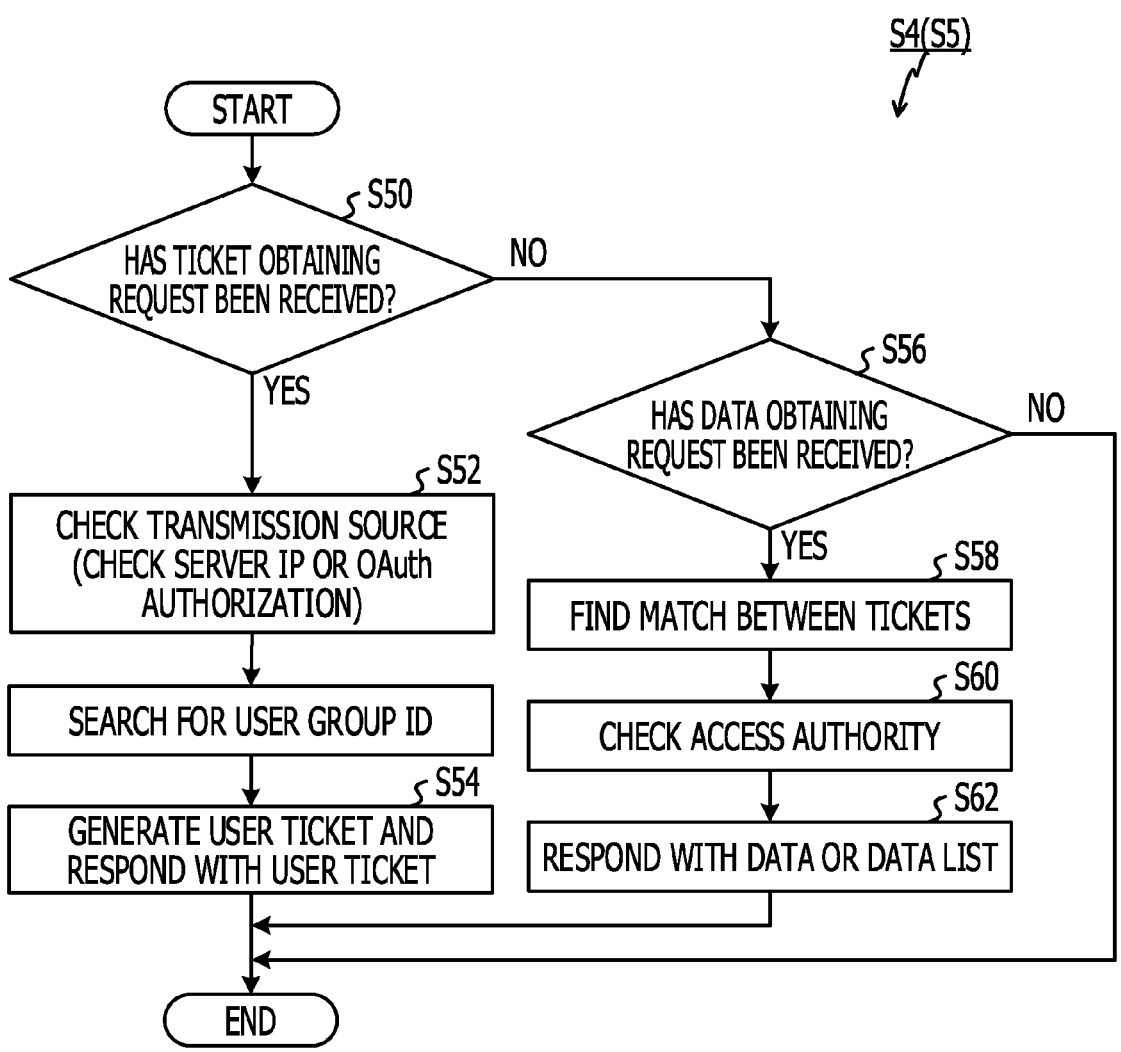
FIG. 15 is a flowchart of a process at step S4 in the second embodiment.

FIG. 15 depicts a process corresponding to FIG. 9 of the first embodiment by using a flowchart. In this process, the ticket issuing unit 16 performs a process at step S53 between steps S52 and S54, as indicated by a bold line in FIG. 15.

In the process of FIG. 15, for example, when the user 2 makes a ticket obtaining request as a user of the service X, the ticket issuing unit 16 searches the user group retaining unit 38 (FIG. 13A) for an entry of the service X and User2 at step S53. With this, the user group ID (UGID1) is obtained. Then at step S54, the ticket issuing unit 16 searches the ticket retaining unit 36 for service ID="Group" and user ID="UGID1". In this case, if a ticket has not been issued, the ticket issuing unit 16 newly generates a ticket character string and responds (transmits the character string) to the user 2, thereby updating the entries in the ticket retaining unit 36. If a ticket has been issued, the ticket issuing unit 16 obtains the ticket from the ticket retaining unit 36 and responds (transmits the ticket) to the user 2.

As described above, according to the second embodiment, when users under a plurality of services are identical, an identical (common) ticket is issued to that user. With this, ticket management by the user is simplified.

Third Embodiment

Figure 16:
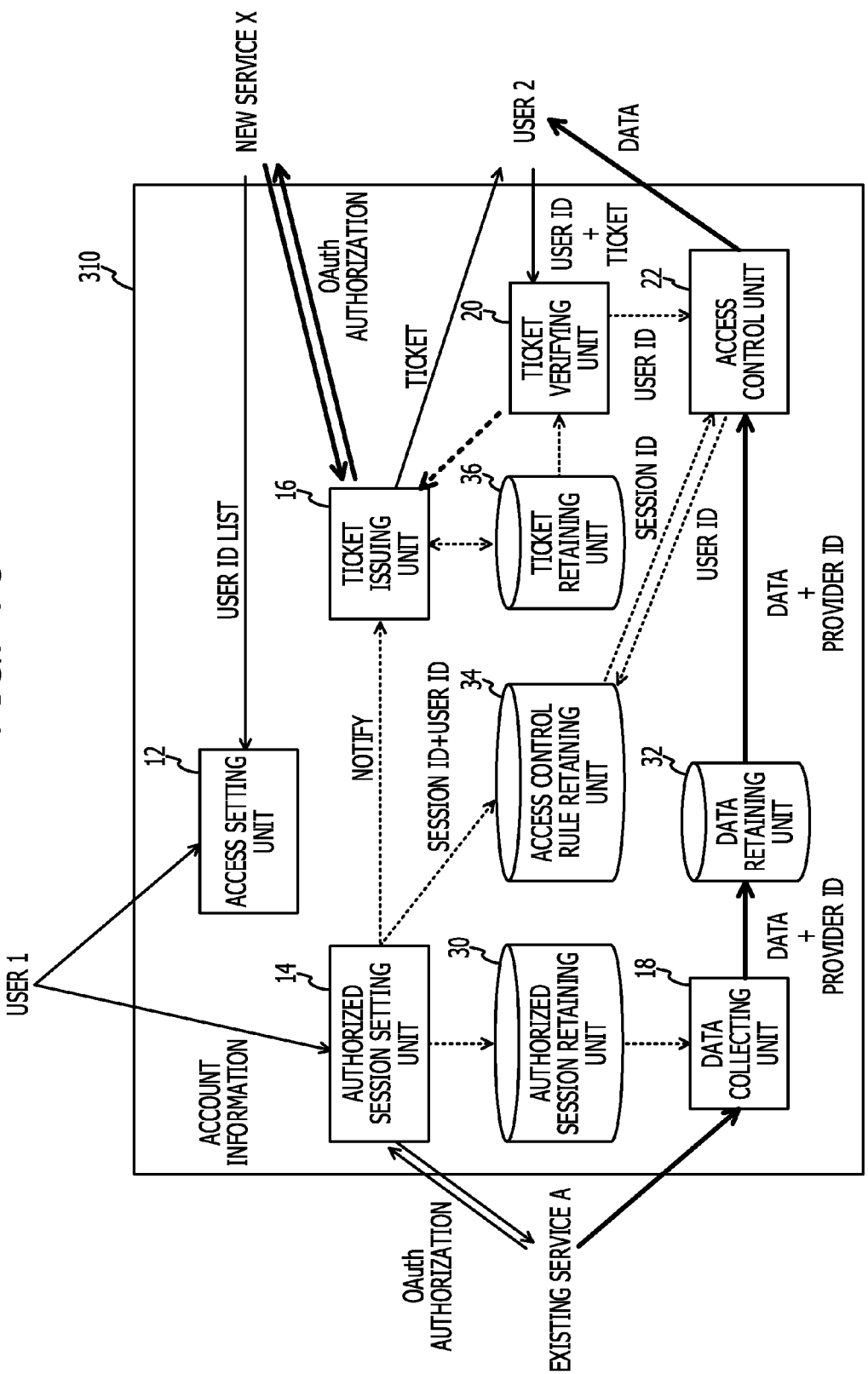
FIG. 16 is a functional block diagram of an agent server according to a third embodiment.
Figure 17:
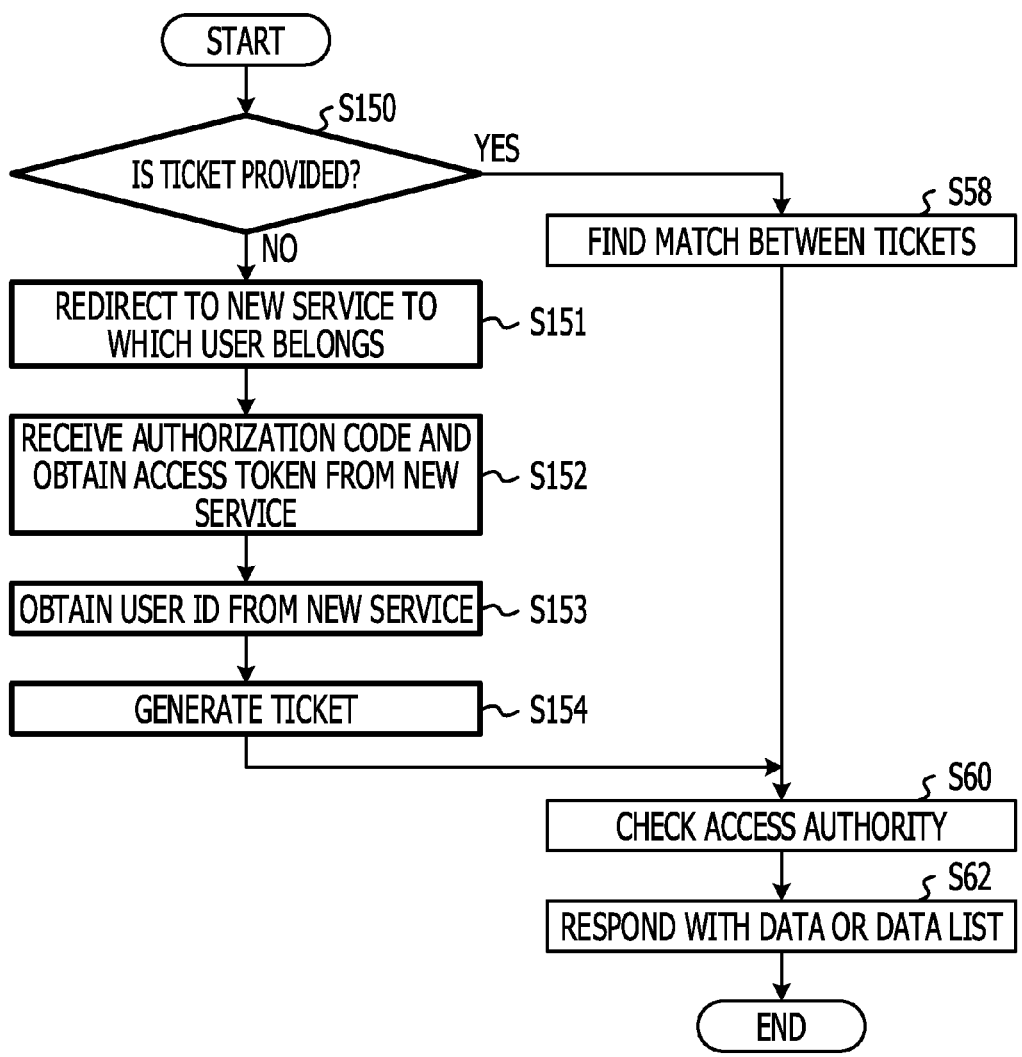
FIG. 17 is a flowchart of a process at step S4 in the third embodiment.
Figure 18:
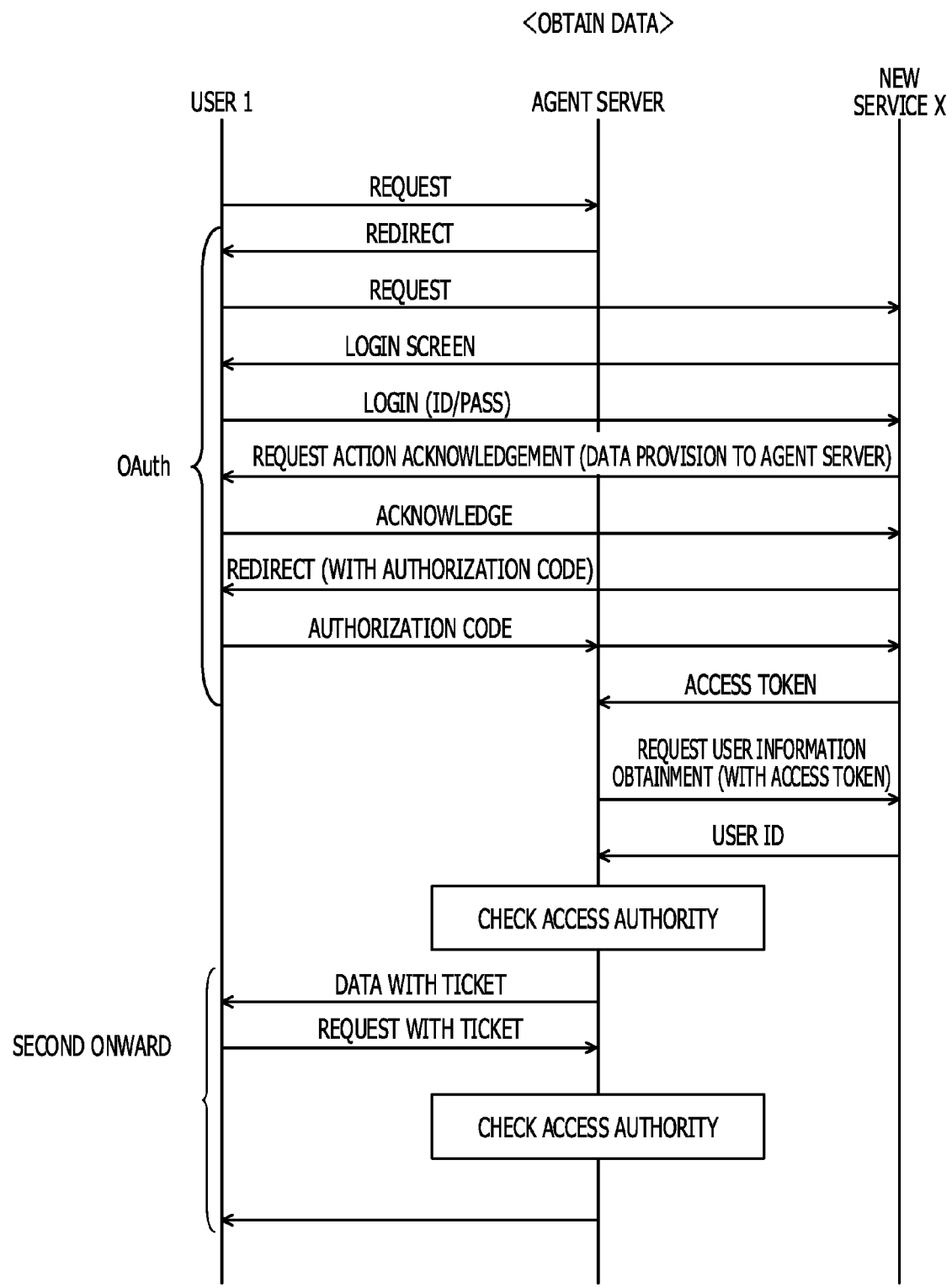
FIG. 18 depicts a data obtaining process in the third embodiment.

Next, a third embodiment is described based on FIG. 16, FIG. 17, and FIG. 18. In the first embodiment described above, description is made in which a ticket issuing timing and a ticket using timing are different. In the third embodiment, as depicted in FIG. 16, OAuth authorization is performed between the new service X and an agent server 310, thereby allowing ticket issuance and first data provision to be simultaneously performed. In this case, steps S52 and S54 of FIG. 9 described in the first embodiment are not performed. Instead, processes indicated by bold lines in FIG. 17 are performed.

At step S150 of FIG. 17, when a data obtaining request comes from the user 2 of the new service X (User2) to the agent server 310, the ticket verifying unit 20 determines whether a ticket is provided to the request. When the determination at step S150 is negative, that is, when data is provided for the first time (when no ticket is owned), the procedure proceeds to step S151. When the procedure proceeds to step S151, the ticket verifying unit 20 passes the ID (X) of the new service X and the user ID (User2) to the ticket issuing unit 16.

At steps S151 and S152, the ticket issuing unit 16 transfers access authority by OAuth for User2 of the new service X. For example, in the case of OAuth 2.0, the agent server 310 returns a response for instructing redirection to the user 2, and the user 2 then accesses the login screen of the new service X for login. Then, the new service X returns a screen for confirming that data is provided to the agent server 310, and the user 2 acknowledges as such. Then, with a response from the new service X, redirection is made to a URL of the agent server 310 (S151). At this time, the agent server 310 receives an authorization code from a character string included in a parameter of the URL, and the agent server 310 passes the authorization code to the new service X, thereby obtaining an access token from the new service X (S152).

Next at step S153, the ticket issuing unit 16 uses the obtained access token to obtain the relevant user ID (User2) from the new service X, and confirms that the obtained user ID is identical to the user ID (User2) from which the request has come.

Then at step S154, the ticket issuing unit 16 newly creates a ticket (T1). The ticket issuing unit 16 also adds an entry of service ID=X, user ID=User2, and ticket=T1 to the ticket retaining unit 36, and notifies the ticket verifying unit 20 of the end of verification and the ticket T1. In this case, the ticket verifying unit 20 notifies the access control unit 22 of the user User2 of the new service X and the ticket T1. Thereafter, as with the first embodiment, steps S60 and S62 are performed.

When the determination at step S150 is positive, that is, when data is provided for the second time onward, the user makes a request for data provision by adding the ticket, and therefore the procedure proceeds to step S58. Then, at steps S58 to S62, processes similar to those of the first embodiment are performed.

FIG. 18 depicts a flow of the process of FIG. 17 (such as data exchange).

As described above, in the third embodiment, a process only for ticket issuance is deleted, and ticket issuance and data provision for the first time are simultaneously performed (in a series of processes). With this, the user 2 of the new service X more easily receives data.

Fourth Embodiment

Figure 20:
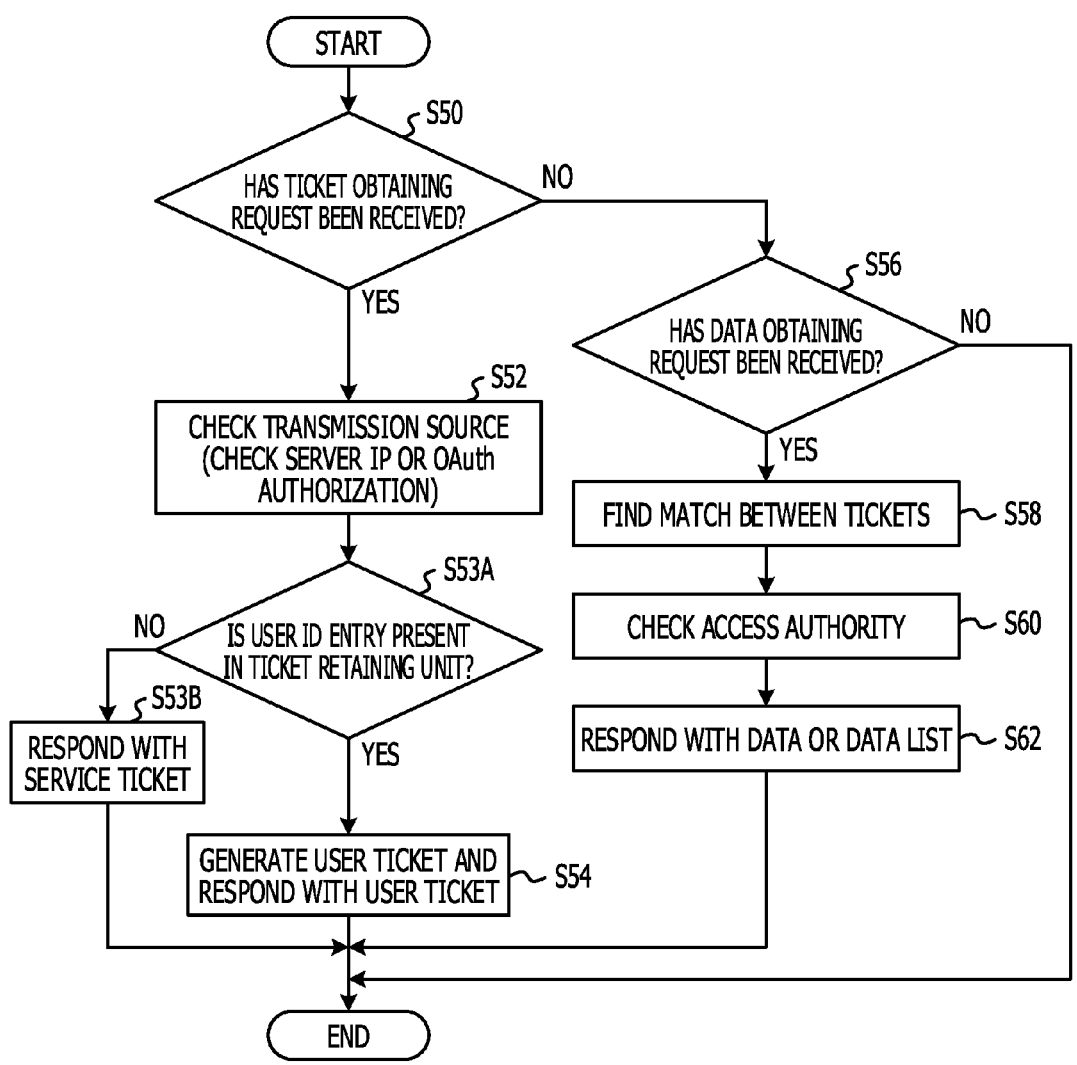
FIG. 20 is a flowchart of a process at step S4 in the fourth embodiment.

Next, a fourth embodiment is described based on FIG. 19A, FIG. 19B, and FIG. 20. The structure of an agent server of the fourth embodiment is similar to that in FIG. 3. In the first embodiment described above, when the user 1 as a data provider may provide data to all users under the new service, different tickets are issued to all users, and the issued tickets have to be managed. In this case, the number of tickets to be managed may become huge. In consideration of this point, in the fourth embodiment, the ticket issuing unit 16 issues a ticket (service ticket) for the entire service when data is permitted to be provided to the entire service.

Specifically, when the user 1 instructs the agent server to provide data to all users of the new service X, the authorized session setting unit 14 stores a session ID and a service on the data receiving side (service ID=X, user ID=wildcard "*") in the access control rule retaining unit 34 (refer to the last row in FIG. 19B). Next, the authorized session setting unit 14 notifies the ticket issuing unit 16 of the service on the data receiving service (type="Service", service ID=X, and user ID=wildcard "*"). The ticket issuing unit 16 then checks whether the new service X is registered in the ticket retaining unit 36. If the new service X is not registered, the new service X is registered in the ticket retaining unit 36 (refer to the last row in FIG. 19A). It is assumed that a field indicating the type of ticket is added to the ticket retaining unit 36 of FIG. 19A, as evident from comparison with FIG. 4D.

FIG. 20 depicts a flowchart of processes corresponding to those in FIG. 9 of the first embodiment. In the processes in FIG. 20, a determination at step S53A is made between step S52 and step S54 of FIG. 9. That is, after the end of step S52, the ticket issuing unit 16 determines at step S53A whether a user ID entry is present in the ticket retaining unit 36. The determination at step S53A is positive, the ticket issuing unit 16 generates a user-dedicated ticket and responds with the ticket at step S54.

On the other hand, when the determination at step S53A is negative, the ticket issuing unit 16 responds with a service-dedicated ticket (a service ticket).

When the user receives data provision and the user-dedicated ticket is added to the request, the access control unit 22 handles both of an entry where the user ID in the access control rule retaining unit 34 (FIG. 19B) is specified and an entry where the user ID indicates a wildcard "*" as a user accessible data range (an authorized session group).

In the above, the case is described in which a service-dedicated ticket is passed to each user when data is provided to all users under the new service X. However, this is not meant to be restrictive. For example, a mechanism similar to that described above may also be applied when the new service X is permitted to obtain data.

As described above, in the fourth embodiment, by introducing a service-dedicated ticket, the number of tickets to be managed is decreased when data is provided to a service or all users in the service.

Fifth Embodiment

Figure 21:
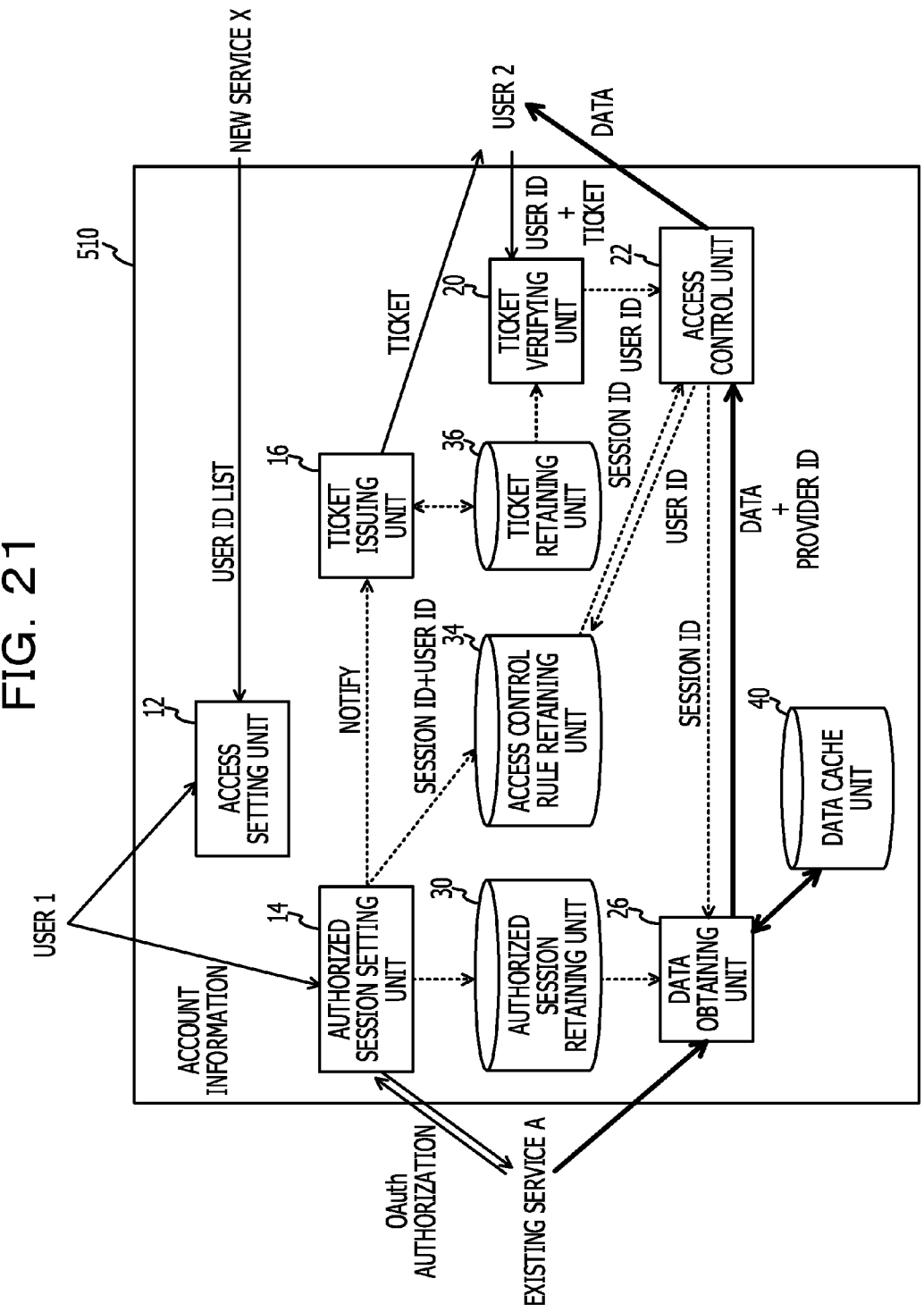
FIG. 21 is a functional block diagram of an agent server according to a fifth embodiment.
Figure 22:
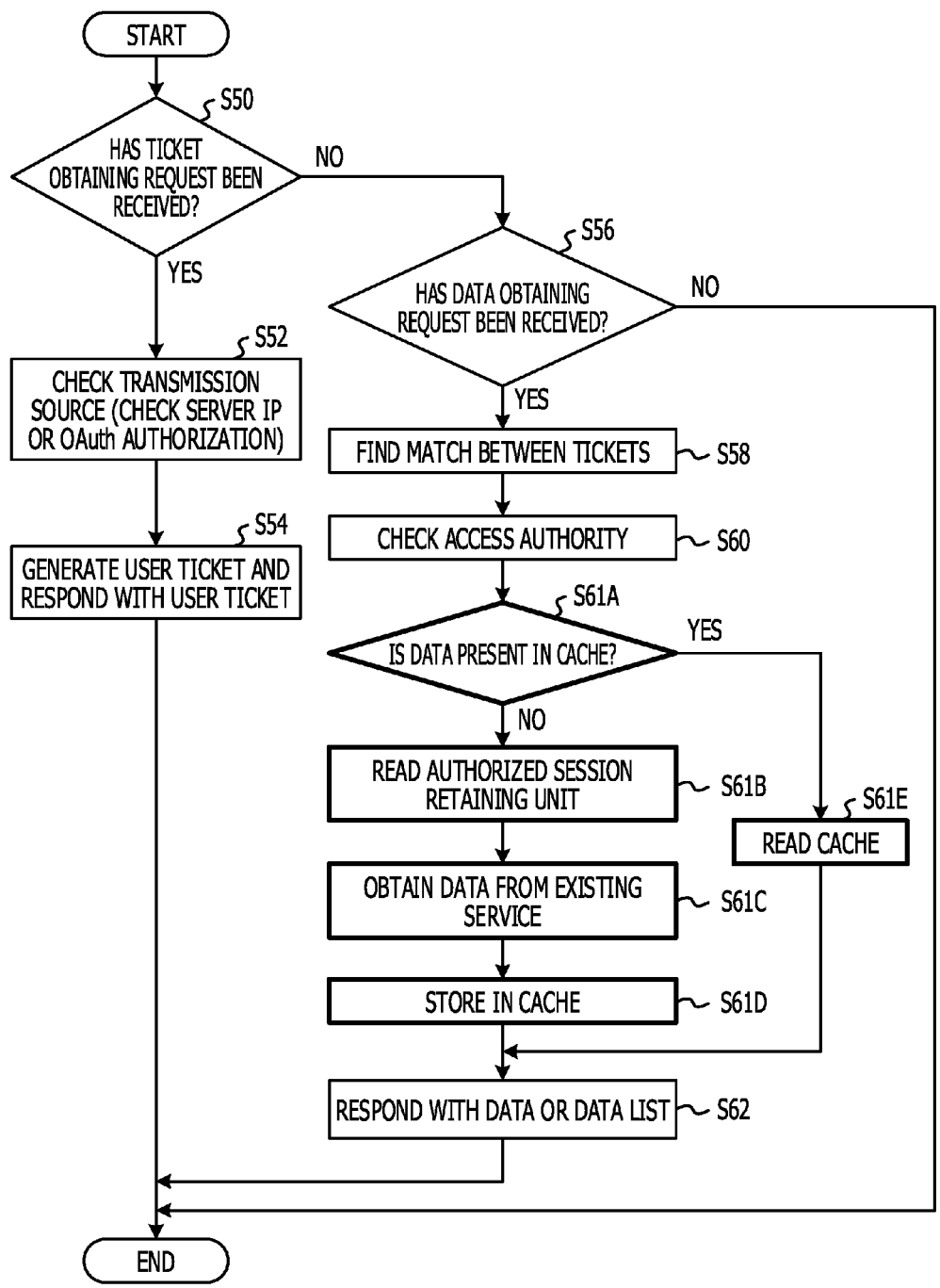
FIG. 22 is a flowchart of a process at step S4 in the fifth embodiment.

Next, a fifth embodiment is described based on FIG. 21 and FIG. 22. FIG. 21 depicts a functional block diagram of an agent server 510 according to the fifth embodiment. As evident from comparison between FIG. 21 and FIG. 3 (the agent server 10 of the first embodiment), the agent server 510 has a data obtaining unit 26 in place of the data collecting unit 18 depicted in FIG. 3. Also, the agent server 510 has a data cache unit 40 in place of the data retaining unit 32 depicted in FIG. 3.

Upon obtaining the session ID of the authorized session from the access control unit 22, the data obtaining unit 26 reads an access token corresponding to that ID from the authorized session retaining unit 30, and obtains data from the existing service A. The data obtaining unit 26 searches the data cache unit 40 before obtaining data from the existing service A. When the data to be obtained is stored in the data cache unit 40, the data obtaining unit 26 does not obtain that data from the existing service A. On the other hand, when the data to be obtained is not stored in the data cache unit 40, the data obtaining unit 26 obtains that data from the existing service A, stores the obtained data in the data cache unit 40, and returns the data. The data obtaining unit 26 then passes the data present in the data cache unit 40 or the data obtained from the existing service A and stored in the data cache unit 40 to the access control unit 22. The data cache unit 40 is assumed to be a table for retaining a data group for each of session IDs of authorized sessions.

FIG. 22 depicts a process corresponding to the process of FIG. 9 in the first embodiment. In the process depicted in FIG. 22, the data obtaining unit 26 performs processes and determination at steps S61A to S61E between step S60 and step S62 of FIG. 9.

When the user 2 adds the ticket T1, the ID (X) of the new service X, and the ID (User2) of the user to make a data obtaining request to the agent server 510, the ticket verifying unit 20 finds a match between the received ticket and the contents in the ticket retaining unit 36 (S58). When the combination therebetween is correct, the ticket verifying unit 20 notifies the access control unit 22 of the ID (User2) of the user 2 of the new service X (S60). The access control unit 22 also reads an entry in the access control rule retaining unit 34 to obtains a session ID (SID1) of an authorized session accessible by the user 2 of the new service X. The access control unit 22 then notifies the data obtaining unit 26 of the session ID (SID1).

The data obtaining unit 26 searches the data cache unit 40 with the session ID (SID1) as a key at step S61A of FIG. 22, thereby checking the presence or absence of data. When the data ID is specified by the user 2, the data obtaining unit 26 searches the data cache unit 40 also with that ID as a key.

When the request is made for the first time, no data is found in the data cache unit 40. Therefore, the determination at step S61A is negative, and the data obtaining unit 26 proceeds to step S61B. At step S61B, the data obtaining unit 26 searches the authorized session retaining unit 30 with the session ID (SID1) as a key, and obtains an access token (Token1).

Next at step S61C, the data obtaining unit 26 uses the access token (Token1) to obtain data from the existing service A. Next at step S61D, the data obtaining unit 26 stores the obtained data in the data cache unit 40. Then at step S62, the data stored in the data cache unit 40 is passed to the access control unit 22. In this case, the access control unit 22 responds to the user 2 with the data passed from the data obtaining unit 26.

When the determination at step S61A is positive, the data obtaining unit 26 reads data from the data cache unit 40 at step S61E. At step S62, the data obtaining unit 26 passes the read data to the access control unit 22. Also in this case, the access control unit 22 responds to the user 2 with the data passed from the data obtaining unit 26.

Data updating, addition, and deletion may be performed in the existing service A. In this case, as with a cache technique in related art, an expiration date may be set to the data and the data may be deleted by the data cache unit 40. Alternatively, the data in the data cache unit 40 may be deleted from obsolete data if the cache capacity exceeds an upper limit. Still alternatively, for example, caching of part of data may be prohibited.

As described above, according to the fifth embodiment, the data obtaining unit 26 does not collect data in advance.

Thus, even if a link is established to an existing service handling an enormous amount of data, the data capacity to be retained by the agent server 510 is decreased while the performance is kept to some extent, thereby putting cost down.

Sixth Embodiment

Figure 23:
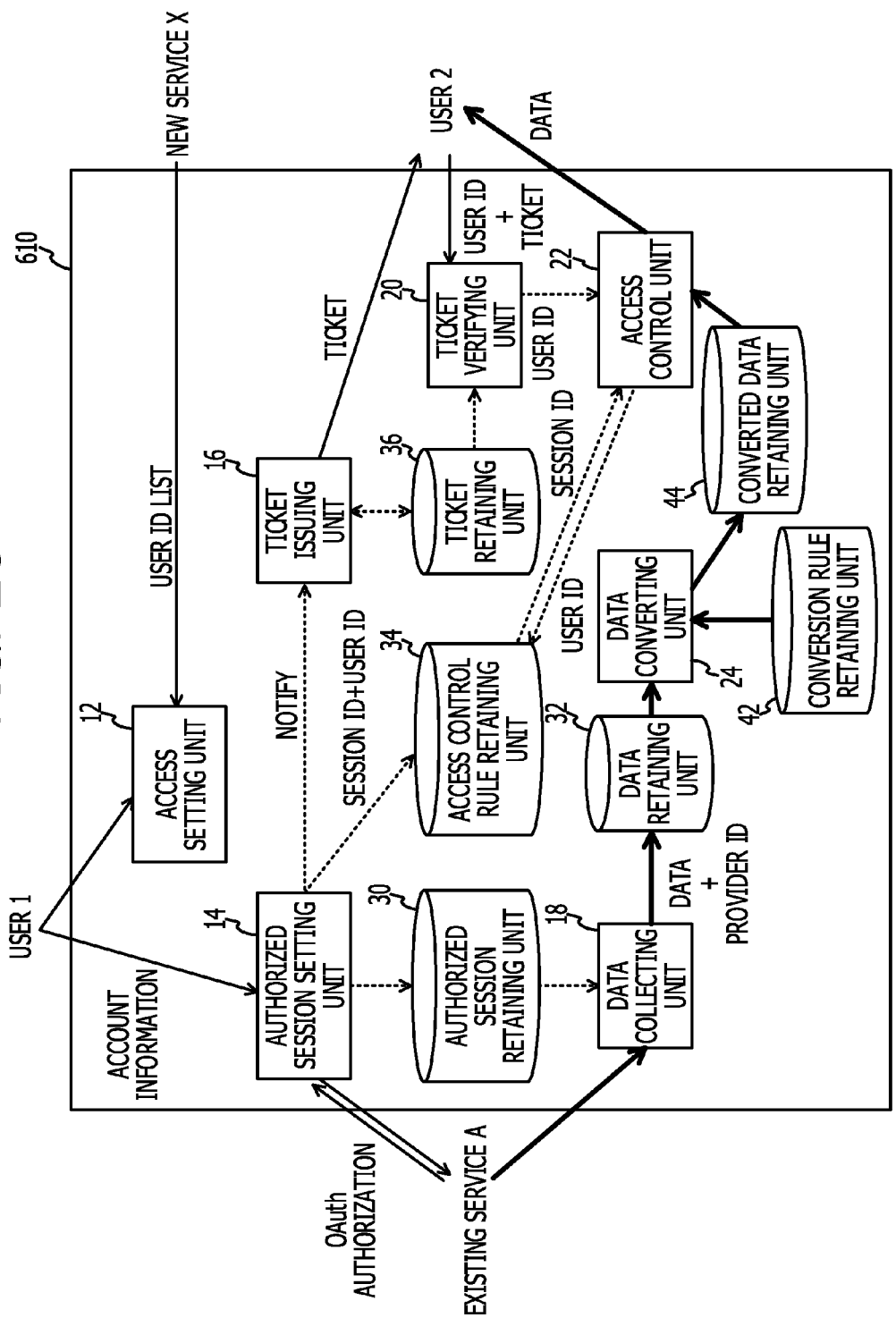
FIG. 23 is a functional block diagram of an agent server according to a sixth embodiment.

Next, a sixth embodiment is described based on FIG. 23, FIG. 24A, FIG. 24B, and FIG. 25. FIG. 23 depicts a functional block diagram of an agent server 610 according to the sixth embodiment.

The agent server 610 has a converted data retaining unit 44, a conversion rule retaining unit 42, and a data converting unit 24, in addition to the structure of the agent server 10 of the first embodiment.

The converted data retaining unit 44 is a table for retaining a data group for each of session IDs of authorized sessions, and has a data structure similar to that of the data retaining unit 32.

The conversion rule retaining unit 42 is a table for retaining a rule for a converting process for each combination between an existing service and a new service and, specifically, has a data structure as depicted in FIG. 24A. In FIG. 24A, it is defined that a JSON format is converted to an XML format and the field name of "Field1" is changed to "Data_ID" when data is passed from the existing service A to the new service X.

The data converting unit 24 reads data in the data retaining unit 32, converts the data by following the rule defined in the conversion rule retaining unit 42, and then stores the converted data in the converted data retaining unit 44. For example, when data depicted in FIG. 24B is converted by following a conversion rule of FIG. 24A, data depicted in FIG. 24C is obtained.

Figure 25:
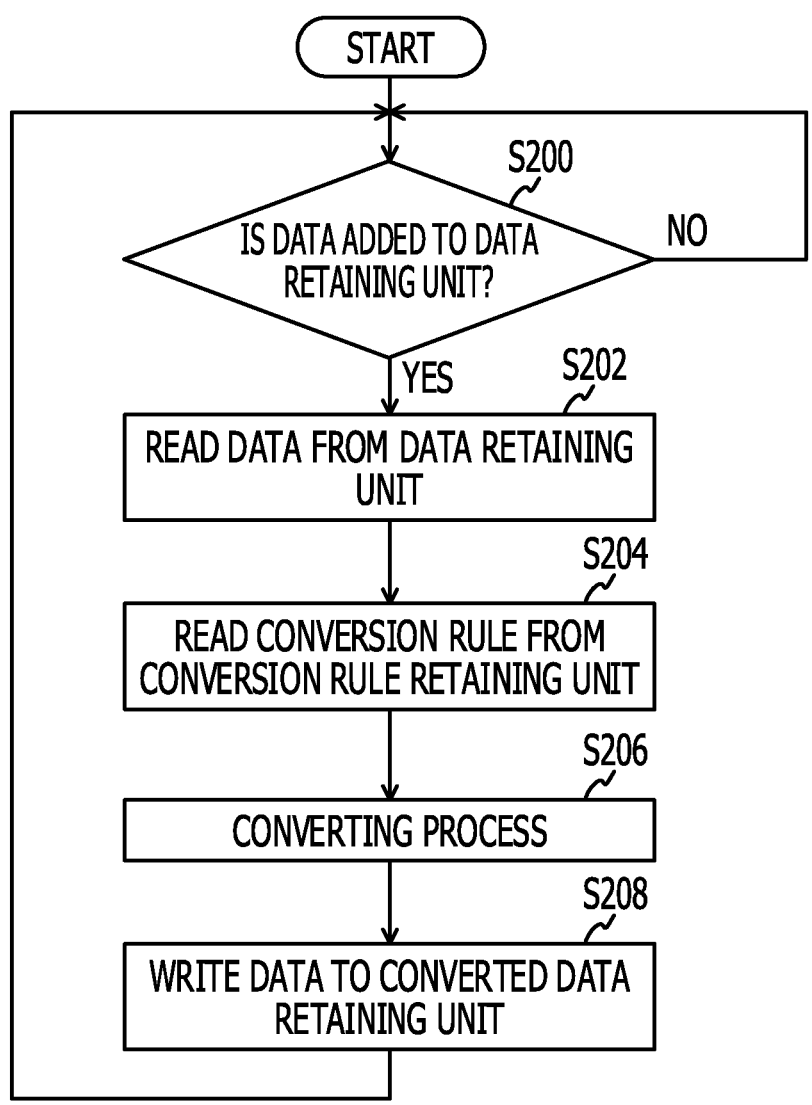
FIG. 25 is a flowchart of a process of a data converting unit in the sixth embodiment.

FIG. 25 is a flowchart of a specific process of the data converting unit 24. At step S200 of FIG. 25, the data converting unit 24 continuously checks data in the data retaining unit 32. When new data is added, the procedure proceeds to step S202. At step S202, the data converting unit 24 reads the newly added data from the data retaining unit 32. Next at step S204, the data converting unit 24 reads an entry from the conversion rule retaining unit 42 by taking the service ID (A) of the read data as a search key. Then at step S206, the data converting unit 24 converts the data based on the read entry. At step S208, the data converting unit 24 writes the converted data to the converted data retaining unit 44. Thereafter, the procedure returns to step S200, repeating the processes described above.

As described above, according to the sixth embodiment, the data converting unit 24 performs a data converting process to allow a link with a plurality of existing services.

In FIG. 24A, a conversion rule is defined with an existing service and a new service. However, this is not meant to be restrictive, and a plurality of existing services may only be converted to a common data format. Also in this case, the new service X is allowed to establish a link with a plurality of existing services by only being aware of the data format provided from the agent server 610.

The first to sixth embodiments may be combined as appropriate.

The process functions described above are embodied by a computer. In this case, a program is provided in which process details of the functions to be included in a processing device are written. By the computer executing the program, the process functions are embodied on the computer. The program having the process details written therein may be recorded in a computer-readable recording medium.

To distribute the program, for example, the program is merchandized in a form of being recorded on a portable recording medium such as a digital versatile disc (DVD) or a compact disc read only memory (CD-ROM). Alternatively, the program may be stored in a storage device of a server computer and may be transferred from the server computer to another computer via a network.

The computer for executing the program stores the program recorded on the portable recording medium or transferred from the server computer in a storage device of the computer. The computer then reads the program from the storage device, and performs a process by following the program. The computer may directly read the program from the portable recording medium, and may perform the process by following the program. Also, every time a program is transferred from the server computer, the computer may perform a process by following the received program one by one.

The embodiments described above are merely suitable examples. However, these embodiments are not restrictive, and are variously modifiable in a range not deviating from the gist of the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
a first server configured to provide a first service usable by a first user, and store data stored by the first user;
a second server configured to provide a second service usable by a second user;
a first user terminal of the first user;
a second user terminal of the second user; and
a third server configured to include a memory and a processor coupled to the memory, wherein the processor is configured to:
receive a first instruction from the first user terminal, the first instruction designating user identification identifying the second user,
receive, from the first user terminal, an account information of the first user to receive the first service from the first server,
generate a session between the first server and the third server by an access authority transfer process using the account information, the access authority transfer process transferring an access authority of the first service from the first user to the third server,
obtain the data from the first server using the session,
register the data obtained using the session and the user identification identifying the second user into the memory,
receive a second instruction from the second user terminal via the second server, the second instruction including the user identification,
generate first authentication information when the user identification in the second instruction is registered in the memory,
register the first authentication information in association with the user identification into the memory,
transmit the first authentication information to the second user terminal,
receive a third instruction from the second user terminal, the third instruction including the first authentication information,
convert the data collected from the first service based on a predetermined conversion rule, and
transmit the converted data to the second user terminal when an authentication using the first authentication information is successful.

2. The system according to claim 1, wherein the processor is configured to:
receive a fourth instruction from the first user terminal, the fourth instruction for disclosing the data about the first service to a third user using a third service different from the first service and the second service, and
transmit, to a third user terminal of the third user, second authentication information identical to the first authentication information transmitted to the second user terminal when the second user and the third user are identical.

3. The system according to claim 1, wherein the processor is configured to:
receive a fifth instruction from the first user terminal, the fifth instruction for disclosing the data about the first service to all users including the second user capable of using the second service, and
transmit third authentication information common among the all users to the all users based on a reception of the fifth instruction.

4. The system according to claim 1, wherein the processor is configured to collect the data to be disclosed to the second user from the first server using the session.

5. The system according to claim 4, wherein the processor is configured to cache the data collected from the first server.

6. A method performed by a third server, the method comprising:
receiving a first instruction from a first user terminal of a first user, the first instruction designating user identification identifying a second user, the first user being provided a first service from a first server that stores data stored by the first user and the second user being provided a second service from a second server, the second user having a second user terminal;
receiving, from the first user terminal, an account information of the first user to receive the first service from the first server;
generating a session with the first server and a third server by an access authority transfer process using the account information, the access authority transfer process transferring an access authority of the first service from the first user to the third server;
obtaining the data from the first server using the session;
registering the data obtained using the session and the user identification identifying the second user into a memory of the third server;
receiving a second instruction from the second user terminal via the second server, the second instruction including the user identification;
generating first authentication information when the user identification in the second instruction is registered in the memory;

registering the first authentication information in association with the user identification into the memory;

transmitting the first authentication information to the second user terminal;

receiving a third instruction from the second user terminal, the third instruction including the first authentication information;

converting the data obtained from the first server based on a predetermined conversion rule; and transmitting the converted data to the second user terminal when an authentication using the first authentication information is successful.

7. The method according to claim 6, further comprising:
receiving a fourth instruction from the first user terminal, the fourth instruction for disclosing the data about the first service to a third user using a third service different from the first service and the second service; and transmitting, to a third user terminal of the third user, second authentication information identical to the first authentication information transmitted to the second user terminal when the second user and the third user are identical.

8. The method according to claim 6, further comprising:
receiving a fifth instruction from the first user terminal, the fifth instruction for disclosing the data about the first service to all users including the second user capable of using the second service; and transmitting third authentication information common among the all users to the all users based on a reception of the fifth instruction.

9. The system according to claim 6, further comprising:
collecting the data to be disclosed to the second user from the first server using the session.

10. The system according to claim 9, further comprising: caching the data collected from the first server.

11. A third server comprising:
a memory; and
a processor coupled to the memory and configured to:
receive a first instruction from a first user terminal of a first user, the first instruction designating user identification identifying a second user, the first user being provided a first service from a first server that stores data stored by the first user and the second user being provided a second service from a second server, the second user having a second user terminal, receive, from the first user terminal, an account information of the first user to receive the first service from the first server, generate a session with the first server by an access authority transfer process using the account information, the authority transfer process transferring an access authority of the first service from the first user to apparatus, obtain the data from the first server using the session, register the data obtained using the session and the user identification identifying the second user into the memory, receive a second instruction from the second user terminal via the second server, the second instruction including the user identification, generate first authentication information when the user identification in the second instruction is registered in the memory, register the first authentication information in association with the user identification into the memory, transmit the first authentication information to the second user terminal, receive a third instruction from the second user terminal, the third instruction including the first authentication information, convert the data collected from the first service based on a predetermined conversion rule, and transmit the converted data to the second user terminal when an authentication using the first authentication information is successful.

12. The third server according to claim 11, wherein the processor is configured to:
receive a fourth instruction from the first user terminal, the fourth instruction for disclosing the data about the first service to a third user using a third service different from the first service and the second service, and transmit, to a third user terminal of the third user, second authentication information identical to the first authentication information transmitted to the second user terminal when the second user and the third user are identical.

13. The third server according to claim 11, wherein the processor is configured to:
receive a fifth instruction from the first user terminal, the fifth instruction for disclosing the data about the first service to all users including the second user capable of using the second service, and transmit third authentication information common among the all users to the all users based on a reception of the fifth instruction.

14. The third server according to claim 11, wherein the processor is configured to collect the to be disclosed to the second user from the first server using the session.

15. The third server according to claim 14, wherein the processor is configured to cache the data collected from the first server.

* * * * *